US009256429B2

(12) United States Patent
Chen et al.

(10) Patent No.: US 9,256,429 B2
(45) Date of Patent: Feb. 9, 2016

(54) SELECTIVELY ACTIVATING A RESUME CHECK OPERATION IN A MULTI-THREADED PROCESSING SYSTEM

(71) Applicants: Lin Chen, San Diego, CA (US); Yun Du, San Diego, CA (US); Andrew Gruber, Arlington, MA (US)

(72) Inventors: Lin Chen, San Diego, CA (US); Yun Du, San Diego, CA (US); Andrew Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 688 days.

(21) Appl. No.: 13/624,657

(22) Filed: Sep. 21, 2012

(65) Prior Publication Data
US 2014/0047223 A1 Feb. 13, 2014

Related U.S. Application Data

(60) Provisional application No. 61/680,990, filed on Aug. 8, 2012.

(51) Int. Cl.
*G06F 9/38* (2006.01)
*G06F 9/30* (2006.01)

(52) U.S. Cl.
CPC .......... *G06F 9/30072* (2013.01); *G06F 9/3005* (2013.01); *G06F 9/3009* (2013.01); *G06F 9/3851* (2013.01); *G06F 9/3885* (2013.01); *G06F 9/3887* (2013.01)

(58) Field of Classification Search
None
See application file for complete search history.

(56) References Cited

U.S. PATENT DOCUMENTS

| | | | |
|---|---|---|---|
| 4,435,758 A | 3/1984 | Lorie et al. |
| 5,555,428 A | 9/1996 | Radigan et al. |
| 5,689,677 A | 11/1997 | MacMillan |
| 6,947,047 B1 | 9/2005 | Moy et al. |
| 7,366,879 B2 | 4/2008 | Rodgers et al. |
| 7,477,255 B1 | 1/2009 | Lindholm et al. |
| 7,543,136 B1 | 6/2009 | Coon et al. |
| 7,617,384 B1 | 11/2009 | Coon et al. |
| 7,761,697 B1 | 7/2010 | Coon et al. |
| 7,788,468 B1 | 8/2010 | Nickolls et al. |
| 7,877,585 B1 | 1/2011 | Coon et al. |

(Continued)

OTHER PUBLICATIONS

Collange, "Une architecture unifiee pour traiter la divergence de controle et la divergence memoire en SIMT", Symposium en Architectures, Saint-Malo, France, May 11, 2011, 13 pp., English translation of abstract only.

(Continued)

*Primary Examiner* — Kenneth Kim
(74) *Attorney, Agent, or Firm* — Shumaker & Stieffert, P.A.

(57) ABSTRACT

This disclosure describes techniques for selectively activating a resume check operation in a single instruction, multiple data (SIMD) processing system. A processor is described that is configured to selectively enable or disable a resume check operation for a particular instruction based on information included in the instruction that indicates whether a resume check operation is to be performed for the instruction. A compiler is also described that is configured to generate compiled code which, when executed, causes a resume check operation to be selectively enabled or disabled for particular instructions. The compiled code may include one or more instructions that each specify whether a resume check operation is to be performed for the respective instruction. The techniques of this disclosure may be used to reduce the power consumption of and/or improve the performance of a SIMD system that utilizes a resume check operation to manage the reactivation of deactivated threads.

48 Claims, 14 Drawing Sheets

(56) References Cited

U.S. PATENT DOCUMENTS

| | | | |
|---|---|---|---|
| 7,890,735 | B2 | 2/2011 | Tran |
| 2005/0050305 | A1 | 3/2005 | Kissell |
| 2007/0234019 | A1 | 10/2007 | Terashima |
| 2009/0240931 | A1 | 9/2009 | Coon et al. |
| 2011/0072248 | A1 | 3/2011 | Nickolls et al. |
| 2011/0078417 | A1 | 3/2011 | Fahs et al. |
| 2011/0078690 | A1 | 3/2011 | Fahs et al. |
| 2013/0061027 | A1* | 3/2013 | Chen et al. .............. 712/234 |
| 2014/0075165 | A1 | 3/2014 | Chen |

OTHER PUBLICATIONS

Oh et al., "Exploiting Thread-Level Parallelism in Lockstep Execution by Partially Duplicating a Single Pipeline," ETRI Journal, vol. 30, No. 4, Aug. 2008, pp. 576-586.

U.S. Appl. No. 13/227,274, by Lin Chen, filed Sep. 7, 2011.

U.S. Appl. No. 13/608,668, by Lin Chen, filed Sep. 10, 2012.

Brunie et al., "Simultaneous branch and warp interweaving for sustained GPU performance," 2012 39th Annual International Symposium on Computer Architecture (ISCA), Jun. 9-13, 2012, XP032200021, DOI: 10.11 09/ISCA.2012.EI237005, ISBN: 978-1-4673-0475-7, pp. 49-60.

Diamos et al., "SIMD Re-Convergence At Thread Frontiers", Proceedings of the 44th Annual IEEE/ACM International Symposium on Microarchitecture, Dec. 3-7, 2011, XP055056138, DOI: 10.1145/2155620.2155676, pp. 477-488.

International Search Report and Written Opinion—PCT/US2013/049599—ISA/EPO—Jan. 7, 2014, 14 pp.

Meng et al., "Dynamic warp subdivision for integrated branch and memory divergence tolerance," ACM SIGARCH Computer Architecture News, vol. 38, Jun. 19-23, 2010, XP055092509, ISSN: 0163-5964, DOI: 10.1145/1815961.1815992, pp. 235-246.

Collange, "Stack-less SIMT reconvergence at low cost," Sep. 12, 2011, 11 pp. XP055038110.

Wu et al., "Characterization and Transformation of Unstructured Control flow in GPU Applications," Proceedings of the First International Workshop on Characterizing Applications for heterogeneous Exascale Systems, CACHES'11, Jun. 4, 2011, 8 pp. XP055056141.

International Preliminary Report on Patentability from International Application No. PCT/US2013/049599, dated Feb. 19, 2015, 9 pp.

* cited by examiner

| OLD STATE | NEW STATE | EVENT | ACTION |
|---|---|---|---|
| State 0 | State 0 | S | PC+1 |
| | | Jf | Jump to target |
| | | Jb | Jump to target |
| | | BfuT | Branch to target uniformly |
| | | BfuF | PC+1 |
| | | BbuT | Branch to target uniformly |
| | | BbuF | PC+1 |
| State 0 | State 1 | Bbd | Branch to target. Active threads with false condition become inactive. |
| | | Bfd | PC+1. Active threads with true condition become inactive. |
| State 1 | State 0 | n/a | Resume. All inactive threads become active |
| State 1 | State 1 | S | PC+1 |
| | | Jb | Jump to target |
| | | BbuF | PC+1 |
| | | BbuT | Branch to target uniformly |
| | | BfuF | PC+1 |
| | | Bbd | Branch to target. Active threads with false condition become inactive. |
| | | Bfd | PC+1. Active threads with true condition become inactive. |
| | | n/a | Resume. Some inactive threads become active. |
| State 1 | State 2 | Jf | PC+1. All active threads become inactive. |
| | | BfuT | PC+1. All active threads become inactive. |
| State 2 | State 0 | n/a | Resume. All inactive threads become active |
| State 2 | State 1 | n/a | Resume. Some inactive threads become active |
| State 2 | State 2 | Any event | PC+1 |

FIG. 5

```
0       alu1;        // ALU instruction
1       alu2;        // ALU instruction
2       branch #5;   // Forward branch to instruction #5
3       alu3;        // ALU instruction
4       jump #7;     // Forward jump to instruction #7
5       alu4;        // ALU instruction
6       alu5;        // ALU instruction
7       alu6;        // ALU instruction
8       branch #1;   // Backward branch to instruction #1
9       alu7;        // ALU instruction
```

FIG. 13

| Instruction ID | Thread 0 | Thread 1 | Comment |
|---|---|---|---|
| 0 | X | X | |
| 1 | X | X | |
| 2 | X | X | Divergent forward branching |
| 3 | X | O | Thread 1 becomes inactive |
| 4 | X | O | |
| 5 | O | X | Thread 1 is resumed to be active |
| 6 | O | X | |
| 7 | X | X | Thread 0 is resumed to be active |
| 8 | X | X | Divergent backward branching |
| 1 | X | O | Thread 1 becomes inactive |
| 2 | X | O | |
| 3 | X | O | |
| 4 | X | O | |
| 5 | O | O | |
| 6 | O | O | |
| 7 | X | O | Thread 0 is resumed to be active |
| 8 | X | O | |
| 9 | X | X | Thread 1 is resumed to be active |

Execution sequence of two threads (X = active, O= inactive)

FIG. 14

```
0      alu1;        // ALU instruction
1      alu2;        // ALU instruction
2      branch #5;   // Forward branch to instruction #5
3      alu3;        // ALU instruction
4      jump #7;     // Forward jump to instruction #7
5      *alu4;       // ALU instruction
6      alu5;        // ALU instruction
7      *alu6;       // ALU instruction
8      branch #1;   // Backward branch to instruction #1
9      *alu7;       // ALU instruction
```

FIG. 15

| Instruction ID | Thread 0 | Thread 1 | Comment |
|---|---|---|---|
| 0 | X | X | |
| 1 | X | X | |
| 2 | X | X | |
| 3 | X | O | |
| 4 | X | O | |
| 5 | O | X | Resume check point since instruction #5 is forward branch target |
| 6 | O | X | |
| 7 | X | X | Resume check point since instruction #7 is forward jump target |
| 8 | X | X | |
| 1 | X | O | |
| 2 | X | O | |
| 3 | X | O | |
| 4 | X | O | |
| 5 | O | O | Resume check point since instruction #5 is forward branch target |
| 6 | O | O | |
| 7 | X | O | Resume check point since instruction #7 is forward jump target |
| 8 | X | O | |
| 9 | X | X | Resume check point since instruction #9 is immediately after a backward branch |

Execution sequence of two threads (X = active, O= inactive)

FIG. 16

SELECTIVELY ACTIVATING A RESUME CHECK OPERATION IN A MULTI-THREADED PROCESSING SYSTEM

This application claims the benefit of U.S. Provisional Application No. 61/680,990, filed Aug. 8, 2012, the entire content of which is incorporated herein by reference.

TECHNICAL FIELD

The disclosure relates to multi-threaded processing and, more particularly, to techniques for managing divergent branch instructions in a multi-threaded processing system.

BACKGROUND

A single instruction, multiple data (SIMD) processing system is a type of parallel computing system that includes multiple processing elements which execute the same instruction on multiple pieces of data. A SIMD system may be a standalone computer or a sub-system of a computing system. For example, one or more SIMD execution units may be used in a graphics processing unit (GPU) to implement a programmable shading unit that supports programmable shading.

A SIMD processing system allows multiple threads of execution for a program to execute synchronously on the multiple processing elements in a parallel manner, thereby increasing the throughput for programs where the same set of operations needs to be performed on multiple pieces of data. Because each thread operates on different data, if a program includes conditional branch instructions, it is possible that the branch condition may be satisfied for some of the threads executing in the system and not satisfied for other threads executing in the system. Such an instruction may be referred to as a divergent branch instruction and results in the SIMD system not being able to execute all of the threads in a synchronous fashion on the multiple processing elements.

SUMMARY

This disclosure is directed to techniques for handling divergent branch instructions, and more particularly, to techniques for managing the reactivation of threads that may have been deactivated in response to a divergent branch instruction. More specifically, this disclosure is directed to techniques for selectively activating a resume check operation in a single instruction, multiple data (SIMD) processing system. Such techniques may allow a resume check operation that manages the reactivation of deactivated threads to be selectively enabled or disabled on an instruction-by-instruction basis. The techniques of this disclosure may be used to reduce the power consumption of and/or improve the performance of a SIMD system that utilizes a resume check operation to manage the reactivation of deactivated threads.

In one example, this disclosure describes a method that includes executing, with a processor, an instruction that includes information indicative of whether a resume check operation is to be performed for the instruction. The method further includes selectively enabling or disabling, with the processor, the resume check operation for the instruction based on the information included in the instruction. The resume check operation is an operation that includes comparing each of a plurality of resume counter values to a program counter value associated with the instruction. Each of the resume counter values is associated with a respective one of a plurality of threads executing on the processor.

In another example, this disclosure describes a device that includes a processor configured to execute an instruction that includes information indicative of whether a resume check operation is to be performed for the instruction. The processor is further configured to selectively enable or disable the resume check operation for the instruction based on the information included in the instruction. The resume check operation is an operation that includes comparing each of a plurality of resume counter values to a program counter value associated with the instruction. Each of the resume counter values is associated with a respective one of a plurality of threads executing on the processor.

In another example, this disclosure describes an apparatus that includes means for executing an instruction that includes information indicative of whether a resume check operation is to be performed for the instruction. The apparatus further includes means for selectively enabling or disabling the resume check operation for the instruction based on the information included in the instruction. The resume check operation is an operation that includes comparing each of a plurality of resume counter values to a program counter value associated with the instruction. Each of the resume counter values is associated with a respective one of a plurality of threads executing on a processor.

In another example, this disclosure describes a computer-readable storage medium storing instructions that, when executed, cause one or more processors to execute an instruction that includes information indicative of whether a resume check operation is to be performed for the instruction. The instructions further cause the one or more processors to selectively enable or disable the resume check operation for the instruction based on the information included in the instruction. The resume check operation is an operation that includes comparing each of a plurality of resume counter values to a program counter value associated with the instruction. Each of the resume counter values is associated with a respective one of a plurality of threads executing on the one or more processors.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 5 is a state transition table that characterizes exemplary operation of the control flow module illustrated in FIG. 4 according to this disclosure.

FIG. 13 illustrates an example program that may be executed without using the selective resume check activation techniques of this disclosure.

FIG. 14 is a table illustrating an example execution sequence for the example program in FIG. 13 according to this disclosure.

FIG. 15 illustrates an example program that may be executed using the selective resume check activation techniques of this disclosure.

FIG. 16 is a table illustrating an example execution sequence for the example program in FIG. 15 according to this disclosure.

DETAILED DESCRIPTION

Figure 1:
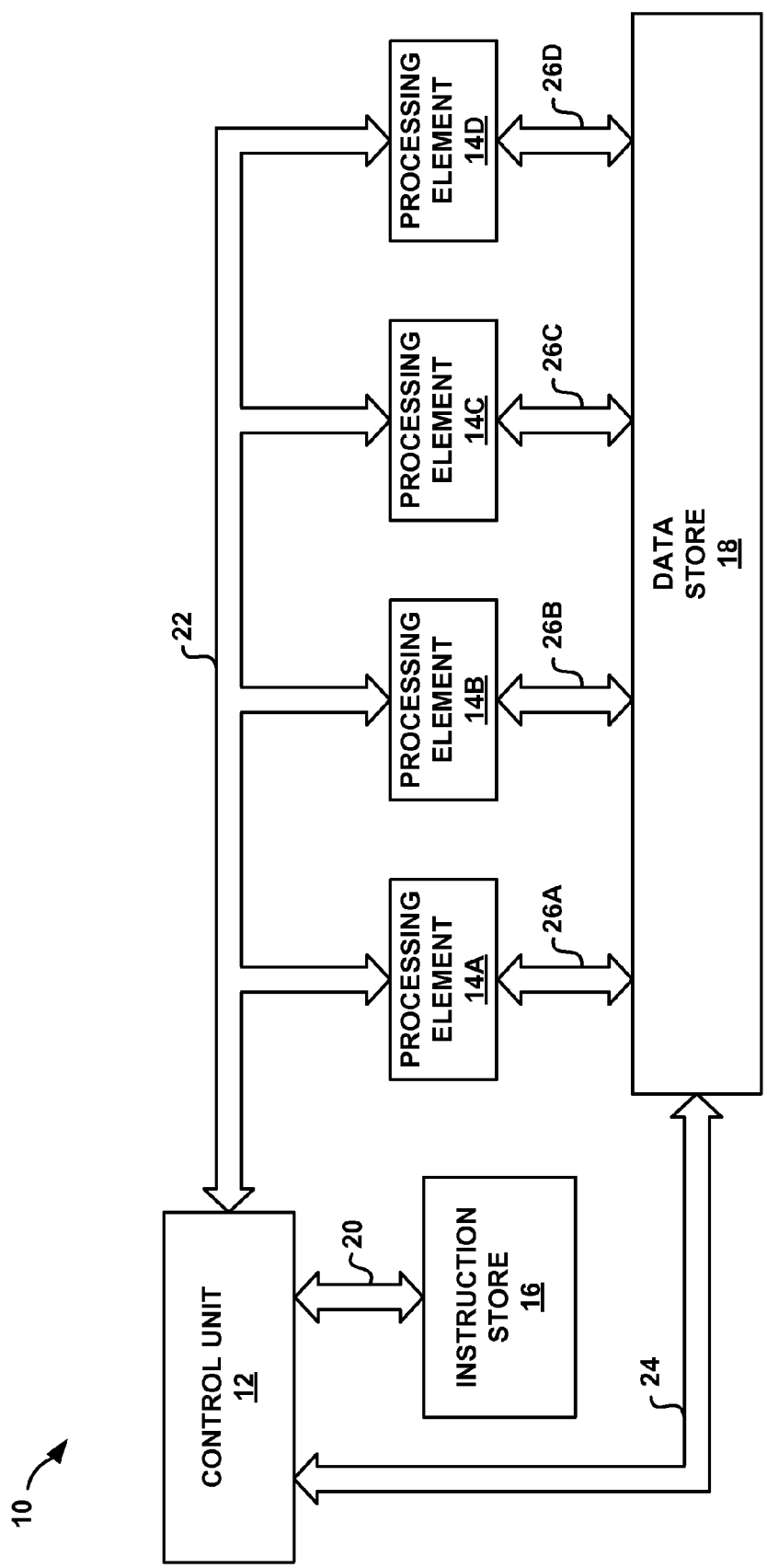
FIG. 1 is a block diagram illustrating an example processing system that may be used to implement the selective resume check activation techniques of this disclosure.

This disclosure is directed to techniques for selectively activating a resume check operation in a single instruction, multiple data (SIMD) processing system. In particular, the techniques of this disclosure may allow a resume check operation that manages the reactivation of deactivated threads to be selectively enabled or disabled on an instruction-by-instruction basis. The techniques of this disclosure may be used to reduce the power consumption of and/or improve the performance of a SIMD system that utilizes a resume check operation to manage the reactivation of deactivated threads.

In a SIMD processing system, all threads may be controlled by a single control flow unit that includes a single program counter. This may allow multiple threads of execution for a program to execute synchronously on multiple processing elements in a parallel manner, thereby increasing the throughput for programs where the same set of operations needs to be performed on multiple pieces of data. However, because each thread operates on different data, if an instruction set architecture (ISA) of the SIMD processing system supports conditional branch instructions, it is possible that the branch condition may be satisfied for some of the threads executing in the system and not be satisfied for other threads executing in the system. Such a branch instruction may be referred to as a divergent branch instruction. If a divergent branch instruction occurs, the next instruction that is scheduled to be executed for some of the active threads may be different than the next instruction that is scheduled to be executed for others of the active threads. This may result in the SIMD processing system not being able to execute all of the threads in a synchronous, lockstep fashion.

One approach for dealing with a divergent branch instruction involves deactivating all of the threads that either satisfied or did not satisfy the branch condition such that the remaining active threads are all synchronized to execute the same next instruction. When a thread is deactivated during a given instruction cycle, the thread does not execute any instructions during the instruction cycle. As such, the remaining threads may continue to execute in a lockstep fashion. To control the reactivation of such deactivated threads, a resume counter-based approach may be used that involves allocating a resume counter for each thread executing in the processing system, setting the resume counter for each thread being deactivated to a value that is indicative of a program counter value at which the respective thread should be reactivated, and automatically performing a resume check operation prior to the execution of every instruction. One drawback of automatically performing the resume check operation for every instruction is that the resume check operation may consume a significant amount of power each time the operation is performed and may contribute significantly to the time it takes to process an instruction in the SIMD processing system.

According to this disclosure, techniques are described for allowing a resume check operation to be selectively enabled or disabled on an instruction-by-instruction basis. A resume check operation may not necessarily need to be performed for every instruction in a program for proper execution of the program in the SIMD processing system. For example, for certain instructions in a program, a compiler may be able to determine that thread reactivation will not need to occur at such instructions during the execution of the program. Therefore, by allowing the resume check operation to be selectively enabled and disabled on an instruction-by-instruction basis according to the techniques of this disclosure, the resume check operation may be disabled for such instructions where it has been determined that no thread reactivation will need to occur. In this manner, the techniques of this disclosure may be used to reduce the power consumption of and/or increase the performance of a SIMD processing system in comparison to a processing system where the resume check operation is automatically performed for each instruction in the program.

According to some aspects of this disclosure, a processor is described that is configured to selectively enable or disable a resume check operation for an instruction based on information included in the instruction that indicates whether a resume check is to be performed for the instruction. If the instruction indicates that a resume check operation is to be performed for the instruction, then the processor may perform a resume check operation during the instruction cycle that is used for executing the instruction. Similarly, if the instruction indicates that a resume check operation is not to be performed for the instruction, then the processor may not perform a resume check operation during the instruction cycle that is used for executing the instruction.

The resume check operation may be an operation, for example, that includes comparing each of a plurality of resume counter values to a program counter value associated with a currently processed instruction. Each of the resume counter values may be associated with a respective one of a plurality of threads executing on a processor. If the resume counter value for a deactivated thread is equal to the current program counter value, then the thread may be reactivated. Otherwise, if the resume counter value for the deactivated thread is not equal to the current program counter value, then the thread may remain deactivated. Any threads that were already active prior to performing the resume check operation may remain active after performing the resume check operation.

According to additional aspects of this disclosure, an instruction set architecture (ISA) is described that allows a resume check operation to be selectively enabled or disabled on an instruction-by-instruction basis. For example, an ISA may include one or more instructions where each of the instructions has an information field that specifies whether a resume check operation is to be performed when the respective instruction is executed (e.g., during an instruction cycle associated with the instruction). In some examples, the information field may be a single bit that is either set or reset depending on whether a resume check should be performed for the instruction.

According to further aspects of this disclosure, a compiler is described that is configured to generate compiled instructions that include information indicative of whether a resume check is to be performed for particular compiled instructions. In some examples, the compiler may select one or more instructions of a program as being instructions for which a resume check operation is to be performed when the program is executed. In response to selecting the one or more instructions, the compiler may generate compiled code for the program such that the compiled code includes the selected one or more instructions and such that the selected one or more instructions include information indicating that the resume check operation is to be performed for the selected one or more instructions.

As one specific example, the compiler may select an instruction as being an instruction for which a resume check operation is to be performed if the instruction is a target instruction of a forward branch instruction, a target instruction of a forward jump instruction, and if the instruction is a next sequential instruction after a backward branch instruction. In this specific example, for any other instructions that were not identified as being a target instruction of a forward branch instruction or a forward jump instruction or as being a next sequential instruction after a backward branch instruction, the compiler may determine that a resume check operation does not need to be performed for such instructions because any threads that are deactivated during the execution of the program will not need to be reactivated at such instructions. Not performing a resume check operation for such instructions may reduce the power consumption of and/or improve the performance of a SIMD system compared to a system where the resume check operation is performed for every instruction.

Other techniques for managing divergent threads may include using a stack to store synchronization tokens and divergence tokens. For example, each time a branch instruction occurs that allows for divergence, a synchronization token may be pushed onto a stack indicating the threads that were active when the branch instruction was originally encountered. If the branch instruction is a divergent branch instruction, then the system may push a divergence token onto a stack indicating the threads that did not take the branch and a program counter value corresponding to a next instruction for the threads that did not take the branch. The system may continue executing the remaining threads that did take the branch until a flag in the software instructions is encountered that instructs the system to pop (i.e., pull) the divergence token off of the stack. In response to popping the divergence token off of the stack, the system may proceed to deactivate the threads that did take the branch, and to reactivate and execute the threads that did not take the branch. The system may continue executing the remaining threads that did not take the branch until another flag in the software instructions is encountered that instructs the system to pop the synchronization token off of the stack. In response to popping the synchronization token off of the stack, the system may proceed to reactivate the threads such that the thread state is the same as when the divergent branch instruction was originally encountered.

One drawback of this approach, however, is that the number of nested divergent branches that the system can handle is limited based on the size of the stack. A nested divergent branch may refer to a divergent branch that occurs during the execution of either the taken path or the not taken path of another divergent branch instruction. That is, a nested divergent branch is a divergent branch that occurs when one or more threads have already been deactivated due to a previously occurring divergent branch instruction and such threads have not yet reactivated.

In contrast to the stack-based approach for reactivating divergent threads described above, the resume counter-based approach described in this disclosure may use a finite set of resume counters, as opposed to a stack, to control the reactivation of deactivated threads. Therefore, the number of nested divergent branches that such an approach can handle is conceptually infinite and not limited based on the size of a stack. Moreover, by allowing the resume check operation to be selectively enabled and disabled according to the techniques of this disclosure, the power consumption of the processing system may be reduced and/or the performance of the processing system may be increased compared to a processing system where the resume check operation is automatically performed for each instruction in the program.

FIG. 1 is a block diagram illustrating an example processing system 10 that may be used to implement the selective resume check activation techniques of this disclosure. Processing system 10 is configured to execute instructions for a program in a parallel manner. Processing system 10 includes a control unit 12, processing elements 14A-14D (collectively "processing elements 14"), an instruction store 16, a data store 18, and communication paths 20, 22, 24, 26A-26D. Communication paths 26A-26D may be referred to collectively as "communication paths 26."

In some examples, control unit 12 and processing elements 14 may be hardware components that form a programmable processor or part of a programmable processor. For example, control unit 12 and processing elements 14 may together form a graphics processing unit (GPU) or a part of a GPU.

Processing system 10 may be implemented in a personal computer, a desktop computer, a laptop computer, a computer workstation, a tablet computing device, a video game platform or console, a wireless communication device (such as, e.g., a so-called smartphone, a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer, any other type of device that processes and/or displays graphical data, or any type of device that performs computations.

In some examples, processing system 10 may be a single-instruction, multiple-data (SIMD) processing system that is configured to execute a plurality of threads of execution for a program using processing elements 14. In such a SIMD system, processing elements 14 may together process a single instruction at a time with respect to different data items. The program may retire after all of the threads associated with the program complete execution.

Control unit 12 is configured to control processing system 10 to execute instructions for a program stored in instruction store 16. For each of one or more instructions of the program, control unit 12 may retrieve the instruction from instruction store 16 via communication path 20, process the instruction, and determine a next instruction to be processed by processing system 10.

In some examples, control unit 12 may process the instruction by causing an operation associated with the instruction to execute on one or more of processing elements 14. For example, the instruction retrieved by control unit 12 may be an arithmetic instruction that instructs processing system 10 to perform an arithmetic operation with respect to data items specified by the instruction, and control unit 12 may cause one or more of processing elements 14 to perform the arithmetic operation on the specified data items. In further examples, control unit 12 may process the instruction without causing an operation to be performed on processing elements 14. For example, the instruction may be a jump instruction that does not necessarily require an operation to be performed by processing elements 14.

Control unit 12 may cause an operation to be performed on one or more of processing elements 14 by providing an instruction to processing elements 14, via communication path 22. The instruction may specify the operation to be performed by processing elements 14. The instruction provided to processing elements 14 may be the same as or different than the instruction retrieved from instruction store 16. In some examples, control unit 12 may cause the operation to be performed on a particular subset of processing elements 14 by one or both of activating a particular subset of processing elements 14 upon which the operation should be performed and deactivating another subset of processing elements 14 upon which the operation should not be performed.

Control unit 12 may activate and/or deactivate processing elements 14 by providing respective activation and/or deactivation signals to each of processing elements 14 via communication path 22. In some examples, the activation and/or deactivation signals may be included in the instructions provided by control unit 12 to processing elements 14 that specify the operations to be performed by processing elements 14. In further examples, the activation and/or deactivation signals may be separate from the instructions provided by control unit 12 to processing elements 14.

Control unit 12 may execute a plurality of threads of execution for a program using processing elements 14. Each of processing elements 14 may be configured to process instructions of the program for a respective one of the plurality of threads. For example, control unit 12 may assign each of the threads of execution to an individual one of processing elements 14 for processing of the thread. The different threads of execution for the program may execute the same set of instructions with respect to different data items in a set of data items. For example, processing element 14A may execute a first thread of execution for a program stored in instruction store 16 with respect to a first subset of data items in a plurality of data items, and processing element 14B may execute a second thread of execution for the program stored in instruction store 16 with respect to a second subset of data items in the plurality of data items. The first thread of execution may be different than the second thread of execution, and the first subset of data items may be different than the second subset of data items.

In some examples, control unit 12 may activate and deactivate individual threads in the plurality of threads of execution. When control unit 12 deactivates a thread, control unit 12 may also deactivate and/or disable the processing element 14A-14D that is assigned to execute the thread. Similarly, when control unit 12 activates a thread, control unit 12 may also activate the processing element 14A-14D that is assigned to execute the thread. Control unit 12 may activate and deactivate various combinations of one or more threads to assist in the handling of divergent branch conditions as explained in further detail later in this disclosure.

As used herein, an active thread may refer to a thread that is activated and currently configured to execute instructions of a program. An inactive thread may refer to a thread that is deactivated and currently configured to not execute instructions of the program. For a plurality of threads executing in processing system 10 during a given instruction processing cycle, each of the active threads may be configured to process an instruction of the program identified by a global program counter register during the instruction processing cycle with respect to data associated with the respective active thread. During the same instruction processing cycle, each of the inactive threads may be configured to not process the instruction of the program. To configure the active threads to execute the instruction, control unit 12 may, for example, cause processing elements 14 that are associated with the active threads to be activated during the instruction processing cycle. Similarly, to configure the inactive threads to not execute the instruction, control unit 12 may cause processing elements 14 that are assigned to inactive threads to be deactivated during the instruction processing cycle.

In some examples, an instruction processing cycle may refer to the time interval between successive loads of the program counter. For example, an instruction processing cycle may refer to the time between when the program counter is loaded with a first value associated with a first instruction and when the program counter is loaded with a second value associated with a second instruction. The second instruction may be the instruction that is processed by the system immediately after the first instruction. The first and second values may be the same or different values, and the first and second instructions may be the same or different instructions. In some examples, an instruction processing cycle may refer to the time interval between successive synchronous loads of the program counter. A synchronous load of the program counter may, in some examples, refer to a load that is triggered by a clock signal. The instruction processing cycle may be alternatively referred to herein as an instruction cycle or as a processing cycle.

Sometime prior to the processing of the next instruction, control unit 12 may determine a next instruction to be processed by processing system 10. The manner in which control unit 12 determines the next instruction to be processed is different depending on whether the most recently executed instruction is a sequential instruction or a control flow instruction. If the most recently executed instruction is a sequential instruction (i.e., not a control flow instruction), then control unit 12 may determine that the next instruction to be processed by processing system 10 corresponds to a next sequential instruction stored in instruction store 16. For example, instruction store 16 may store instructions for a program in an ordered sequence, and the next sequential instruction may be an instruction that occurs immediately after the most recently executed instruction in the ordered sequence of instructions.

If the most recently executed instruction is a control flow instruction, then control unit 12 may determine the next instruction to be processed by processing system 10 based on information specified in the control flow instruction. For example, the control flow instruction may be an unconditional control flow instruction (e.g., an unconditional branch instruction or a jump instruction) in which case control unit 12 may determine that the next instruction to be processed by processing system 10 is a target instruction identified by the control flow instruction. As another example, the control flow instruction may be a conditional control flow instruction (e.g., a conditional branch instruction) in which case control unit 12 may select one of a target instruction identified by the control flow instruction or a next sequential instruction stored in instruction store 16 as the next instruction to process from instruction store 16.

As used herein, a control flow instruction may refer to an instruction that directs control unit 12 to determine a next instruction to execute based on a technique other than unconditionally selecting a next sequential instruction. A control flow instruction may specify a target instruction stored in instruction store 16. For example, a control flow instruction may include a value indicative of a target program counter value that corresponds to a target instruction stored in instruction store 16. As another example, a control flow instruction may specify a target instruction by directing control unit 12 to pop a return address off a stack storage structure. The return address may correspond to a target instruction stored in instruction store 16. The target instruction may, in some examples, be different than the next sequential instruction stored in instruction store 16. High-level program code may include control flow statements such as, e.g., if, switch, do, for, while, continue, break, and goto statements. A compiler may translate the high-level control flow statements into low-level, e.g., machine-level, control flow instructions.

An instruction that is not a control flow instruction may be referred to herein as a sequential instruction. A sequential instruction may refer to an instruction where control unit 12 necessarily selects a next sequential instruction as being the next instruction to execute. A sequential instruction may, in some examples, not include information that identifies a target instruction.

For control flow instructions, the information that identifies the target instruction may be a value indicative of a target instruction stored in instruction store 16. In some examples, the value indicative of the target instruction may be a value indicative of an instruction address corresponding to the target instruction stored in instruction store 16. The value indicative of the instruction address may, in some cases, be the address of the target instruction stored in instruction store 16. In additional cases, the value indicative of the instruction address may be a value used to calculate the address of the target instruction. In further examples, the value indicative of the instruction address may be a value indicative of a target program counter value that corresponds to the target instruction. The value indicative of the target program counter value may, in some cases, be the target program counter value that corresponds to the target instruction. In additional cases, the value indicative of the target program counter value may be a value used to calculate the target program counter value. The target program counter value that corresponds to the target instruction may, in some examples, be equal to the address of the target instruction stored in instruction store 16.

A control flow instruction may be a forward control flow instruction or a backward control flow instruction. The property of whether the control flow instruction is forward or backward may be referred to as the direction of the control flow instruction. A forward control flow instruction may be a control flow instruction where the target instruction occurs after the control flow instruction in the ordered sequence of instructions stored in instruction store 16. A backward control flow instruction may be a control flow instruction where the target instruction occurs prior to the next sequential instruction in the ordered sequence of instructions stored in instruction store 16. The next sequential instruction may occur immediately after the control flow instruction in the ordered sequence of instructions.

A control flow instruction may be a conditional control flow instruction or an unconditional control flow instruction. A conditional control flow instruction includes information that specifies a condition for jumping to the target instruction associated with the control flow instruction. When processing a conditional control flow instruction, if control unit 12 determines that the condition is satisfied, then control unit 12 may determine that the next instruction to be processed is the target instruction. On the other hand, if control unit 12 determines that the condition is not satisfied, then control unit 12 may determine that the next instruction to be processed is the next sequential instruction stored in instruction store 16. An unconditional control flow instruction does not include information that specifies a condition for jumping to the target instruction associated with the control flow instruction. When processing an unconditional control flow instruction, control unit 12 may unconditionally determine that the next instruction to process is the target instruction identified by the control flow instruction. In other words, the determination in such a case is not conditioned upon any condition specified in the unconditional control flow instruction itself.

An example of a conditional control flow instruction includes a conditional branch instruction. The use of the generic term branch instruction in this disclosure typically refers to a conditional branch instruction unless the branch instruction is otherwise designated as an unconditional branch instruction. Examples of unconditional control flow instructions include jump instructions.

A conditional branch instruction may include conditions that are specified with respect to one or more data item values. For example, one type of condition may be a comparison condition that compares a first data item value to a second data item value for each active thread executing in processing system 10. Comparing the data item values may include, e.g., determining whether the first data item value is greater than, less than, not greater than, not less than, equal to, or not equal to the second data item value. Another type of condition may be a zero check condition that determines whether a data item value for each active thread executing in processing system 10 is equal to or not equal to zero.

Because each of processing elements 14 operates on different data items, the result of evaluating the condition may be different for each active thread executing in processing system 10. If either all of the active threads executing in processing system 10 satisfy the branch condition or all of the active threads executing in processing system 10 do not satisfy the branch condition, then a uniform branching condition occurs and the branching divergence for the branch instruction is said to be uniform. On the other hand, if at least one of the active threads executing in processing system 10 satisfies the branch condition and at least one of the active threads executing in processing system 10 does not satisfy the branch condition, then a divergent branching condition occurs and the branching divergence for the branch instruction is said to be divergent.

The threads executing in processing system 10 may execute the same instruction in a lockstep fashion. In other words, each of processing elements 14 may together execute the same instruction for all active threads during a processing cycle. However, when a divergent branch condition occurs, the threads that satisfied that branch condition may be scheduled to execute next instructions that are different than the next instructions scheduled to be executed by the threads that did not satisfy the branch condition. This may hinder the threads in processing system 10 from executing a single instruction in a lockstep fashion.

To deal with a divergent branch instruction, control unit 12 may, in some examples, deactivate one subset of the threads that either satisfied or did not satisfy the branch condition such that the remaining active threads are all synchronized to execute the same next instruction. To control the reactivation of the deactivated threads, control unit 12 may use a resume counter-based approach that involves allocating a resume counter for each thread executing in the processing system, setting the resume counter for each thread being deactivated to a value that is indicative of a program counter value at which the respective thread is scheduled to be reactivated, and performing a resume check operation at various check points in the program to reactivate the threads.

During a given instruction cycle, the resume check operation may activate any deactivated threads that are scheduled to be reactivated at the current program counter value for the given instruction cycle. The resume check operation may determine whether one or more threads are scheduled to be reactivated at the current program counter value based on one or more resume counter values associated with the one or more threads. For example, the resume check operation may compare each of a plurality of resume counter values to a current program counter value, and for each of the plurality of resume counter values, activate a thread corresponding to the respective resume counter value if the respective resume counter value is equal to the current program counter value.

Each of the resume counter values may be associated with a respective one of a plurality of threads executing on processing system 10, and may be indicative of a program counter value at which the thread is scheduled to be activated if the thread is inactive. In some examples, each of the resume counter values is equal to a default value if the thread corresponding to the respective resume counter value is active. The default value may correspond to a value greater than the address range of the program. For example, the default value may be a maximum register value (i.e., a value that is a largest value that can be represented in a resume counter storage slot or a resume counter register).

According to this disclosure, control unit 12 may be configured to selectively enable and disable the performance of a resume check operation on an instruction-by-instruction basis. For example, control unit 12 may be configured to execute an instruction that includes information indicative of whether a resume check operation is to be performed for the instruction by control unit 12, and to selectively enable or disable the resume check operation for the instruction based on the information included in the instruction. The resume check operation may be an operation that includes comparing each of a plurality of resume counter values to a program counter value associated with the instruction, and for each of the plurality of resume counter values, activating a respective one of the plurality of threads associated with the respective resume counter value if the respective resume counter value is equal to the program counter value.

To selectively enable or disable the resume check operation, control unit 12 may, in some examples, be configured to execute an instruction during an instruction cycle, determine whether information included in the instruction indicates that the resume check operation is to be performed for the instruction, enable the resume check operation for the instruction cycle in response to determining that the information included in the instruction indicates that the resume check operation is to be performed for the instruction, and disable the resume check operation for the instruction cycle in response to determining that the information included in the instruction indicates that the resume check operation is not to be performed for the instruction.

In some examples, the information indicative of whether a resume check operation is to be performed for the instruction may include an information field in the instruction. In some cases, the information field may be a one-bit flag that is indicative of whether a resume check operation is to be performed for the instruction. In further examples, the information indicative of whether a resume check operation is to be performed for the instruction may include an operational code (e.g., op-code). For example, a subset of the operational codes may specify operations for which a resume check operation is to be performed, and another subset of the operational codes may specify operations for which a resume check operation is not to be performed.

In further examples, the instruction may specify a main operation to be performed by processing system 10 in addition to whether a resume check operation is to be performed. In such examples, the resume check operation may be performed prior to performing the main operation. In this way, the main operation may be performed for any threads that are reactivated as part of the resume check operation. In some cases, the resume check operation and the main operation may be performed as part of the same instruction cycle.

The resume check operation may involve, in some examples, the performance of multiple comparison operations, which may consume a significant amount of power each time the operation is performed and may contribute significantly to the time it takes to process an instruction in processing system 10. By allowing the resume check operation to be selectively enabled and disabled according to the techniques of this disclosure, the resume check operation may be disabled for such instructions where it has been determined that no thread reactivation will need to occur. Consequently, the number of resume check operations may be reduced compared to that which would take place in a system that performs a resume check operation for every instruction. In this manner, the techniques of this disclosure may be used to reduce the power consumption of and/or increase the performance of a processing system in comparison to processing systems where a resume check operation is automatically performed for each instruction in the program.

To ensure that proper control flow is maintained when using the above-described resume counter-based approach for thread reactivation, control unit 12 may use a "least-valued address first" thread processing order. In general, the "least-valued address first" thread processing order may refer to a processing order where threads that are scheduled to process instructions at lower-valued addresses are executed prior to threads that are scheduled to process instructions at higher-valued addresses. Such a processing order may prevent the control flow from jumping over any resume points for inactive threads without first reactivating such threads. In other words, such a processing order may ensure that all threads will be active and will have completed processing by the time the last program statement has finished execution.

The "least-valued address first" thread processing order may differentiate which threads are deactivated in response to a divergent branch instruction based on the direction (i.e., forward or backward) of the branch instruction. For example, for a divergent backward branch instruction, control unit 12 may deactivate threads for which the branching condition is not satisfied, set the resume counter value for each thread being deactivated to a value associated with a next sequential instruction that occurs after the branch instruction, load the program counter with a value associated with a target instruction specified by the branch instruction, and proceed to execute those threads for which the branching condition is satisfied. For a divergent forward branch instruction, control unit 12 may deactivate threads for which the branching condition is satisfied, set the resume counter value for each thread being deactivated to a value associated with a target instruction specified by the branch instruction, load the program counter with a value associated with a next sequential instruction that occurs after the branch instruction, and proceed to execute those threads for which the branching condition is not satisfied. Deactivating threads in this manner ensures that divergent threads that are scheduled to process instructions at lower-valued addresses execute prior to threads that are scheduled to process instructions at higher-valued addresses (i.e., a "least-valued address first" thread processing order).

Control unit 12 is communicatively coupled to instruction store 16 via communication path 20, to processing elements 14 via communication path 22, and to data store 18 via communication path 24. Control unit 12 may use communication path 20 to send read instructions to instruction store 16. A read instruction may specify an instruction address in instruction store 16 from which an instruction should be retrieved. Control unit 12 may receive one or more program instructions from instruction store 16 in response to sending the read instruction. Control unit 12 may use communication path 22 to provide instructions to processing elements 14, and in some examples, to receive data (e.g., the result of a comparison instruction for evaluating a branch condition) from processing elements 14. In some examples, control unit 12 may use communication path 24 to retrieve data item values directly from data store 18 (e.g., to evaluate a branch condition). Although FIG. 1 illustrates processing system 10 as including communication path 24, in other examples, processing system 10 may not include communication path 24.

Each of processing elements 14 may be configured to perform operations to assist processing system 10 in processing instructions for the program stored in instruction store 16. In some examples, each of processing elements 14 may be configured to perform the same set of operations. For example, each of processing elements 14 may implement the same instruction set architecture (ISA). In additional examples, each of processing elements 14 may be an arithmetic logic unit (ALU). In further examples, processing system 10 may be a vector processor (e.g., a GPU vector processor), and each of processing elements 14 may be a processing element within the vector processor. In additional examples, processing system 10 may be a SIMD execution unit, and each of processing elements 14 may be a SIMD processing element within the SIMD execution unit.

The operations performed by processing elements 14 may include arithmetic operations, logic operations, comparison operations, etc. Arithmetic operations may include operations such as, e.g., an addition operation, a subtraction operation, a multiplication operation, a division operation, etc. The arithmetic operations may also include, e.g., integer arithmetic operations and/or floating-point arithmetic operations. The logic operations may include operations, such as, e.g., a bit-wise AND operation, a bit-wise OR operation, a bit-wise XOR operation, etc. The comparison operations may include operations, such as, e.g., a greater than operation, a less than operation, an equal to zero operation, a not equal to zero operation, etc. The greater than and less than operations may determine whether a first data item is greater than or less than a second data item. The equal to zero and not equal to zero operations may determine whether a data item is equal to zero or not equal to zero. The operands used for the operations may be stored in registers contained in data store 18.

Each of processing elements 14 may be configured to perform an operation in response to receiving an instruction from control unit 12 via communication path 22. In some examples, each of processing elements 14 may be configured to be activated and/or deactivated independently of the other processing elements 14. In such examples, each of processing elements 14 may perform an operation specified by an instruction in response to receiving the instruction from control unit 12 when the respective processing element 14A-14D is activated, and not perform the operation in response to receiving the instruction from control unit 12 when the respective processing element 14A-14D is deactivated (i.e., not activated).

Each of processing elements 14A-14D may be communicatively coupled to data store 18 via a respective communication path 26A-26D. Processing elements 14 may be configured to retrieve data from data store 18 and store data to data store 18 via communication paths 26. The data retrieved from data store 18 may, in some examples, be operands for the operations performed by processing elements 14. The data stored to data store 18 may, in some examples, be the results of operations performed by processing elements 14.

Instruction store 16 is configured to store a program for execution by processing system 10. The program may be stored as an ordered sequence of instructions. In some examples, each instruction may be addressed by a unique instruction address. In such examples, instruction addresses for later instructions in the sequence of instructions are greater than instruction addresses for earlier instructions in the sequence of instructions. In such examples, the program counter values associated with later instructions in the sequence of instructions may, in some examples, be greater than the program counter values associated with earlier instructions in the sequence of instructions. The program instructions, in some examples, may be machine-level instructions. That is, in such examples, the instructions may be in a format that corresponds to the ISA of processing system 10. Instruction store 16 may be configured to receive a read instruction from control unit 12 via communication path 20, and in response to receiving the read instruction, provide an instruction corresponding to the instruction address specified in the read instruction to control unit 12 via communication path 20. The read instruction may specify an instruction address from which an instruction should be retrieved in instruction store 16.

Instruction store 16 may be any type of memory, cache or combination thereof. When instruction store 16 is a cache, instruction store 16 may cache a program that is stored in a program memory external to processing system 10. Although instruction store 16 is illustrated as being within processing system 10, in other examples, instruction store 16 may be external to processing system 10.

Data store 18 is configured to store data items used by processing elements 14. In some examples, data store 18 may comprise a plurality of registers, each of the registers being configured to store a respective data item within a plurality of data items operated on by processing system 10. Data store 18 may be coupled to one or more communication paths (not shown) that are configured to transfer data between the registers of data store 18 and a memory or cache (not shown).

Although FIG. 1 illustrates a single data store 18 for storing data used by processing elements 14, in other examples, processing system 10 may include separate, dedicated data stores for each of processing elements 14. FIG. 1 illustrates a processing system 10 having four processing elements 14 for exemplary purposes. In other examples, processing system 10 may have the same or a different number of processing elements 14 in the same or a different configuration.

Figure 2:
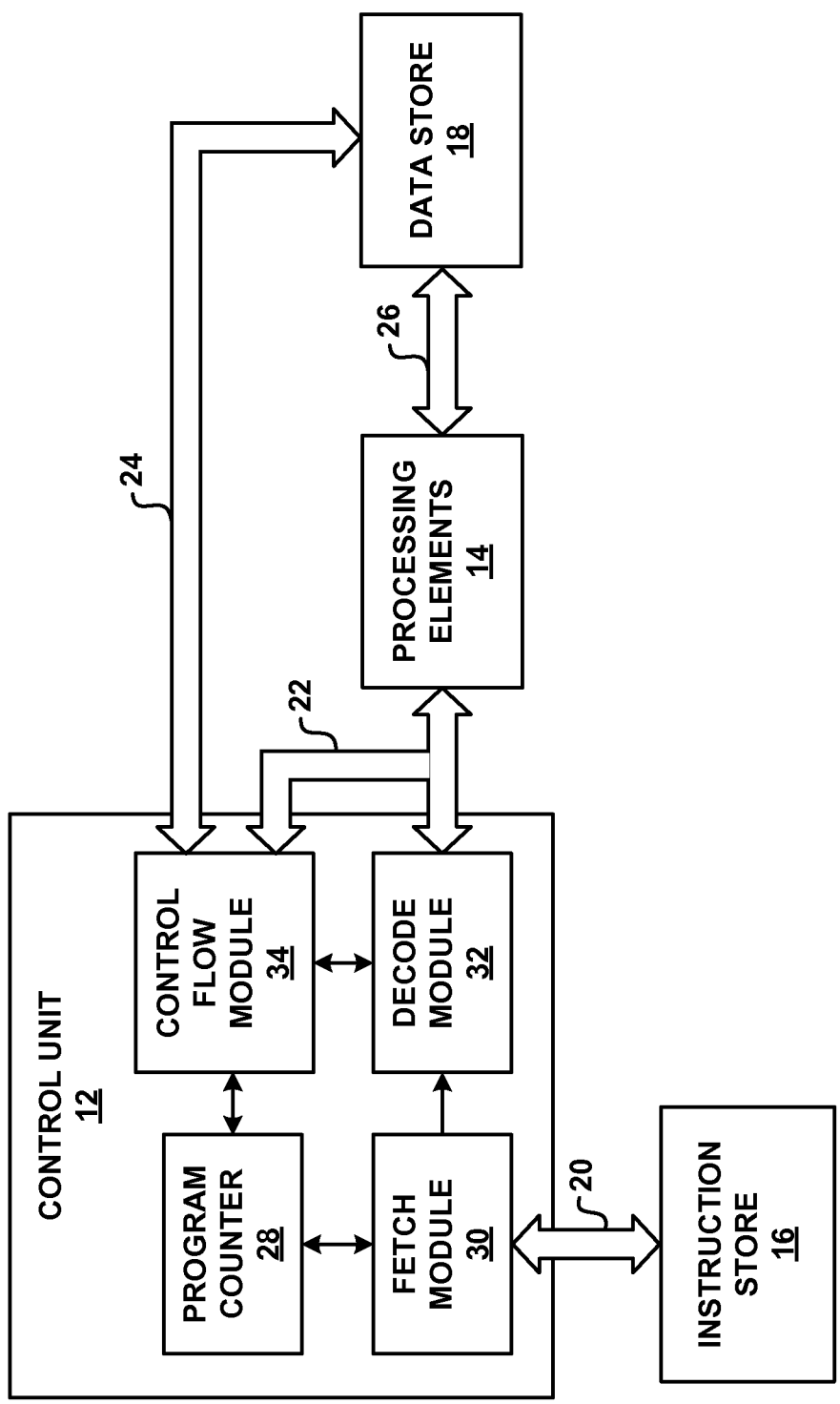
FIG. 2 is a block diagram illustrating a control unit in the example processing system of FIG. 1 in greater detail according to this disclosure.

FIG. 2 is a block diagram illustrating the control unit 12 in the example processing system 10 of FIG. 1 in greater detail according to this disclosure. Control unit 12 includes a program counter 28, a fetch module 30, a decode module 32 and a control flow module 34. Control flow module 34 may be alternatively referred to herein as a control flow unit.

Program counter 28 is configured to store a program counter value. In some examples, program counter 28 may be a hardware register, such as, e.g., a program counter register.

The program counter value may be indicative of an instruction stored in instruction store 16. The program counter value may, in some cases, be equal to the instruction address of the instruction stored in instruction store 16. In additional cases, the program counter value may be used to compute the instruction address of the instruction stored in instruction store 16. For example, the program counter value may be added to an offset value to generate the instruction address. Program counter 28 may be referred to herein as a "global program counter" or a "global program counter register" because program counter 28 may be used as a single program counter for all of processing elements 14.

Fetch module 30 is configured to fetch (e.g., retrieve) an instruction from instruction store 16 based on the program counter value stored in program counter 28. For example, fetch module 30 may fetch an instruction from an instruction address identified by the program counter value stored in program counter 28. Fetch module 30 may provide the fetched instruction to decode module 32 for further processing.

Decode module 32 is configured to decode the instruction received from fetch module 30. Decoding the instruction may involve determining whether the instruction is a type of instruction that can be processed by processing elements 14. If the instruction is a type of instruction that can be processed by processing elements 14, then decode module 32 may cause the instruction to execute on one or more of processing elements 14. In some examples, decode module 32 may cause the instruction to execute on all of processing elements 14. In other examples, decode module 32 may cause the instruction to execute on less than all of processing elements 14. Causing the instruction to execute on one or more of processing elements 14 may, in some cases, include issuing the instruction to one or more of processing elements 14 for execution. For example, decode module 32 may issue a sequential instruction to all processing elements 14 that correspond to active threads for processing. If the instruction is not the type of instruction that can be processed by processing elements 14, then control unit 12 may process the instruction without issuing the instruction to any of processing elements 14 for processing. For example, the instruction may be a control flow instruction of the type that does not require processing by processing elements 14, in which case control unit 12 may process the instruction without issuing the instruction to any of processing elements 14.

In either case, decode module 32 may forward control information to control flow module 34 for further processing. In some examples, the control information may be the instruction itself. In further examples, the control information may include, e.g., information indicative of whether the instruction is a control flow instruction or a sequential instruction; if the instruction is a control flow instruction, information indicative of whether the instruction is a branch instruction or a jump instruction; if the instruction is a branch or jump instruction, information indicative of whether the branch or jump instruction is a forward or backward branch or jump instruction; and if the instruction is a branch instruction, information specifying the branch condition.

Instructions that are of a type that can be processed by processing elements 14 may include arithmetic instructions and logic instructions. An arithmetic instruction may refer to an instruction that instructs processing elements 14 to perform an arithmetic operation, and a logic instruction may refer to an instruction that instructs processing elements 14 to perform a logic operation. In some examples, a control flow instruction may be an instruction of the type that can be processed by processing elements 14 (e.g., the control flow instruction may include a branch condition that is evaluated by processing elements 14). Instructions that are not of a type that can be processed by processing elements 14 may include control flow instructions where the branch condition is evaluated by control unit 12 and/or control flow instructions that do not have a branch condition.

Control flow module 34 may determine a program counter value associated with a next instruction to be processed by control unit 12, and load the program counter value into program counter 28. If the previously fetched instruction is a sequential instruction, then control flow module 34 may select a program counter value that is indicative of a next sequential instruction to load into program counter 28. If the previously fetched instruction is a branch or jump instruction, then control flow module 34 may, in some examples, select one of a target program counter value associated with a target instruction identified by the control flow instruction or a program counter value indicative of a next sequential instruction to load into program counter 28.

In some examples, control flow module 34 may utilize a minimum resume counter (MINRC) to select a new program counter value to load into program counter 28. The MINRC value may be indicative of a smallest resume counter value from a set of resume counter values. In some cases, the set of resume counter values may include the resume counters values for all threads that are executing in the system. In additional cases, the set of resume counter values may include resume counter values for all threads that were active when execution of the currently-executing processing module was initiated. The currently-executing processing module may be, for example, a main program module or a subroutine program module. In examples where a MINRC is used, control flow module 34 may select one of a target program counter value associated with a target instruction specified by the control flow instruction, a program counter value indicative of a next sequential instruction, or a MINRC value to load into program counter 28 for executing the next instruction cycle.

In some examples, control flow module 34 may support the execution of call and return instructions. If the previously fetched instruction is a call instruction, then control flow module 34 may select a target program counter value indicative of the target instruction specified by the call instruction to load into program counter 28. If the previously fetched instruction is a return instruction, then control flow module 34 may select a program counter value indicative of a return address that is popped from a subroutine call stack to load into program counter 28.

Control flow module 34 may store a resume counter value for each thread executing in processing system 10. For example, the number of resume counter values stored in control flow module 34 may be equal to the number of processing elements 14 contained in processing system 10. For each resume counter value, if the thread corresponding to the respective resume counter value is inactive, then the resume counter value may be indicative of a program counter value at which the inactive thread should be activated or reactivated. In other words, the resume counter value may be indicative of a program counter value that corresponds to an instruction at which the inactive thread is scheduled to be reactivated. Otherwise, if the thread corresponding to the respective resume counter value is active, then the resume counter value may be, in some examples, set to a default value (e.g., a maximum register value or a value that is a largest value that can be represented in a storage slot or register for the resume counter).

Control flow module 34 may store an active flag for each thread executing in processing system 10. For example, the number of active flags stored in control flow module 34 may be equal to the number of processing elements 14 contained in processing system 10. Each active flag may indicate whether or not the thread associated with the active flag is active or inactive. Control flow module 34 may set and reset the active flags to activate and deactivate individual threads and individual ones of processing elements 14 corresponding to the threads. For example, control flow module 34 may set an active flag to indicate that the thread associated with the active flag is active, and reset the active flag to indicate that the thread associated with the active flag is inactive. In some examples, each of the active flags may be a single bit.

Control flow module 34 may, in some examples, store a program state. For example, a first program state may indicate that all threads are active, a second program state may indicate that at least on thread is active and at least one thread is inactive and a third program state may indicate that all threads are inactive. The program state may be used in such examples, to select a program counter value to load into program counter 28.

Control flow module 34 may be configured, in some examples, to activate and deactivate one or more of processing elements 14 via communication path 22. In additional examples, control flow module 34 may instruct decode module 32 to activate and deactivate particular processing elements 14.

Control flow module 34 may be configured to perform a resume check operation. The resume check operation may determine which threads are scheduled to be reactivated during the current instruction cycle, and reactivate such threads. For example, the resume check operation may involve, for each of a plurality or resume counter values, comparing the resume counter value to the program counter value stored in program counter 28 for the current instruction cycle, and reactivating a thread corresponding to the resume counter value if the resume counter value equals the program counter value.

According to this disclosure, control flow module 34 may be configured to selectively enable or disable a resume check operation for a particular instruction cycle based on information included in the instruction that is processed during the instruction cycle. The information included in the instruction may specify whether a resume check operation is to be performed for an instruction cycle during which the instruction is executed. For example, each instruction cycle may be associated with a current program counter value stored in program counter 28. During each instruction cycle, control flow module 34 may determine if an instruction corresponding to the current program counter value for the respective instruction cycle indicates that a resume check operation is to be performed for the instruction. If the instruction indicates that a resume check operation is to be performed for the instruction, then control flow module 34 may enable the resume check operation for the current instruction cycle in order to cause the resume check operation to be performed for the current instruction cycle. Similarly, if the instruction indicates that a resume check operation is not to be performed for the instruction, then control flow module 34 may disable the resume check operation for the current instruction cycle in order to cause the resume check operation to be performed for the current instruction cycle.

In some examples, processing system 10 of FIGS. 1 and 2 may be included in a graphics processing unit (GPU). In such examples, processing system 10 may be used to implement a shader unit contained within the GPU, such as, e.g., a vertex shader unit, a pixel shader unit, a fragment shader unit, a geometry shader unit, a unified shader unit, etc. In such examples, processing system 10 may be configured to execute shader programs, such as, e.g., vertex shader programs, fragment shader programs, geometry shader programs, etc.

Figure 3:
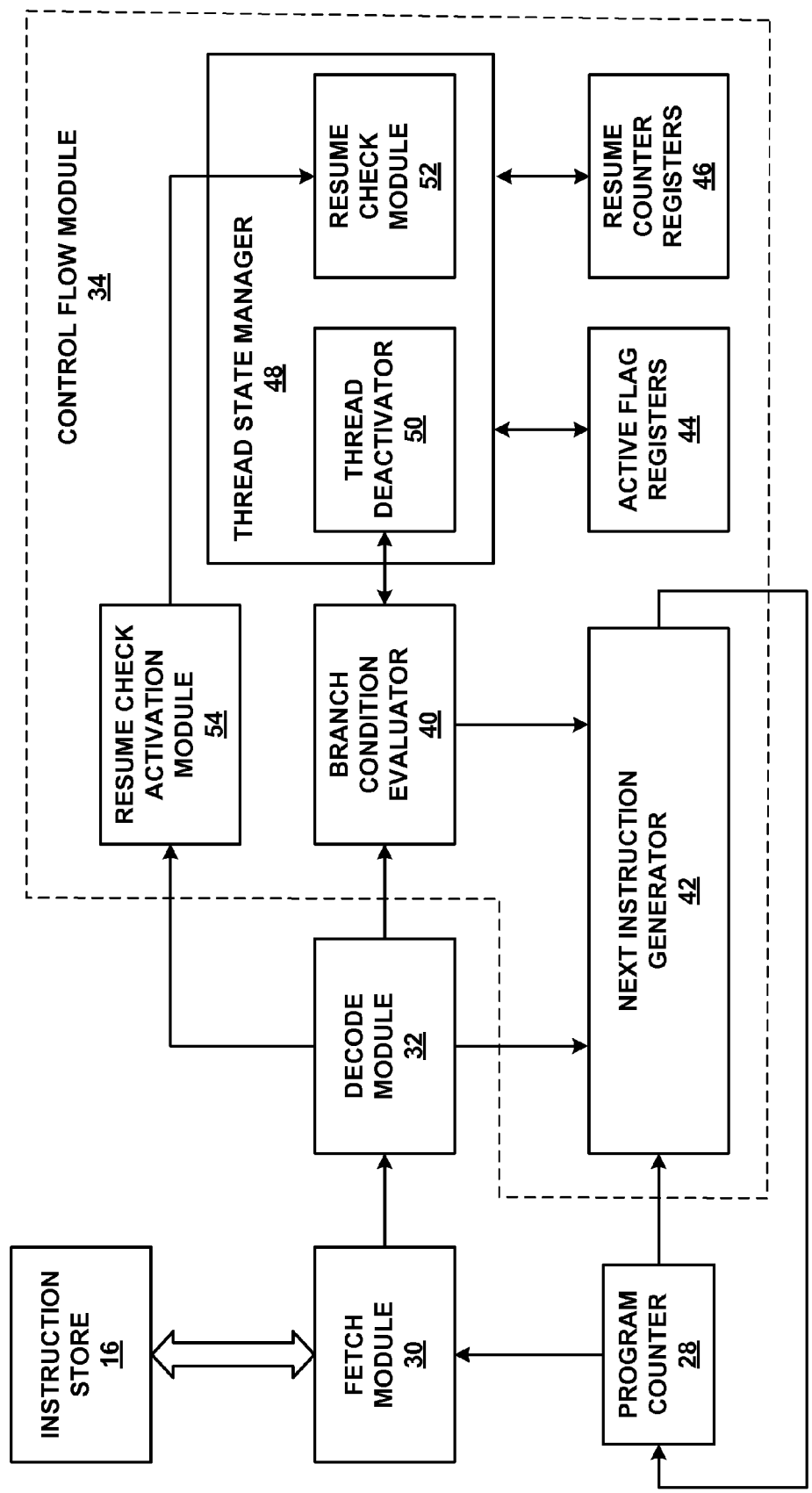
FIG. 3 is a block diagram illustrating an example control flow module that may be used to implement the selective resume check activation techniques of this disclosure.

FIG. 3 is a block diagram illustrating an example control flow module 34 that may be used to implement the selective resume check activation techniques of this disclosure. Control flow module 34 includes a branch condition evaluator 40, a next instruction generator 42, active flag registers 44, resume counter registers 46, a thread state manager 48, a thread deactivator 50, a resume check module 52, and a resume check activation module 54.

Branch condition evaluator 40 is configured to evaluate the branch condition specified by a conditional branch instruction for each active thread executing in processing system 10. Branch condition evaluator 40 may receive information indicative of whether the currently processed instruction is a branch instruction from decode module 32, and if the currently processed instruction is a branch instruction, branch condition evaluator 40 may also receive from decode module 32 information indicative of a branch condition for the currently processed branch instruction. In some examples, one or both of the information indicative of whether the currently processed instruction is a branch instruction and the information indicative of a branch condition may be a representation of the instruction itself. In further examples, one or both of these information components may be a signal that is generated by decode module 32.

Branch condition evaluator 40 may evaluate the same branch condition for each of the active threads of a program using thread-specific data. In some examples, branch condition evaluator 40 may obtain any data needed for evaluating the branch condition for each thread, and internally evaluate the branch condition for each thread to generate a branch condition evaluation result for each thread. In further examples, branch condition evaluator 40 may direct each processing element 14 that corresponds to an active thread to obtain the data needed for evaluating the branch condition for the respective thread, to evaluate the branch condition, and to provide a branch condition evaluation result for the respective thread to branch condition evaluator 40. In either case, branch condition evaluator 40 may determine, for each active thread, whether the branching condition is satisfied for the respective thread.

In some examples, branch condition evaluator 40 may determine whether the branching divergence for the branch instruction is uniform or divergent. For example, branch condition evaluator 40 may determine whether all active threads satisfied the branch condition and whether all active threads did not satisfy the branch condition. If all active threads either satisfied or did not satisfy the branch condition, then branch condition evaluator 40 may determine that the branching divergence for the branch instruction is uniform. If some active threads satisfied the branch condition and some active threads did not satisfy the branch condition, then branch condition evaluator 40 may determine that the branching divergence for the branch instruction is divergent. In examples where the branching divergence is uniform, branch condition evaluator 40 may determine whether the branching condition is uniformly satisfied or uniformly not satisfied.

Branch condition evaluator 40 may provide branch condition status information to thread deactivator 50 of thread state manager 48. The branch condition status information may indicate, for each active thread executing in processing system 10, whether the respective thread satisfied the branch condition or did not satisfy the branch condition (i.e., the branch condition evaluation result for the thread). Thread state manager 48 may use the branch condition status information to determine whether to activate and/or deactivate particular threads in response to executing the branch instruction.

Branch condition evaluator 40 may provide branching divergence information to next instruction generator 42. The branching divergence information may include information indicative of whether the branching divergence for the branch instruction is uniform or divergent. If the branching divergence for the branch instruction is uniform, then the branching divergence information may also include information indicative of whether the branch condition is uniformly satisfied or uniformly not satisfied. In some examples, the branching divergence information may take the form of branch condition status information for each of the active threads. In other examples, the branching divergence information may not necessarily include branch condition status information for the individual threads.

Next instruction generator 42 is configured to generate a program counter value corresponding to a next instruction to be executed during the next processing cycle based on information indicative of the type of instruction currently being executed, information indicative of the branching divergence of the instruction currently being executed if the instruction is a branch instruction, and information indicative of a target instruction specified by the instruction currently being executed if any. Next instruction generator 42 may cause the program counter value generated by next instruction generator 42 to be loaded into program counter 28 when execution of the next instruction cycle in initiated.

The information indicative of the type of instruction currently being executed may be received from decode module 32 and include, e.g., information indicative of whether the instruction is a sequential instruction or a control flow instruction. If the instruction is a control flow instruction, the information indicative of the type of instruction may include, e.g., information indicative of whether the instruction is a branch instruction or a jump instruction. If the instruction is a branch or jump instruction, the information indicative of the type of instruction may include, e.g., information indicative of whether the instruction is a forward branch or jump instruction or whether the instruction is a backward branch or jump instruction.

The information indicative of the branching divergence of the instruction may be received from branch condition evaluator 40 and include, e.g., information indicative of whether the branching divergence is uniform or divergent. If the branching divergence is uniform, the information indicative of the branching divergence of the instruction may include, e.g., information indicative of whether the branch condition is uniformly satisfied or uniformly not satisfied.

The information indicative of the target instruction may be received from decode module 32 and include, e.g., a target program counter value or an offset value that is indicative of a target program counter value. The offset value may be, for example, a value that is added to the program counter to generate the target program counter value. The information indicative of the target instruction may be used to determine a program counter for the next instruction to be executed when the current instruction specifies a target instruction. These instructions may include, for example, conditional branch instructions and jump instructions.

For sequential instructions, next instruction generator 42 may select a program counter value that corresponds to a next sequential instruction as the program counter value to load into program counter 28. The next sequential instruction may refer to an instruction that occurs immediately after the instruction currently being executed in an ordered sequence of instructions for the program stored in instruction store 16.

For a backward jump instruction, next instruction generator 42 may select a target program counter value indicative of the target instruction specified by the backward jump instruction as the program counter value to load into program counter 28. For a forward jump instruction, next instruction generator 42 may, in some examples, select a program counter value that corresponds to a next sequential instruction as the program counter value to load into program counter 28. In response to processing the forward jump instruction, control flow module 34 may, in some example, deactivate all of the threads, and sequentially increment the program counter value until the first of a resume counter value for an inactive thread is reached or the target program counter value for the jump instruction is reached. In this way, a "least-valued address first" processing order for the threads is maintained.

In further examples, for a forward jump instruction, rather than sequentially cycling through a plurality of program counter values to maintain the "least-valued address first" processing order, control flow module 34 may select a program counter value to load into program counter 28 based on a MINRC value stored in a MINRC register (not shown). For example, next instruction generator 42 may, in such examples, determine whether the target program counter value is less than or equal to the MINRC value. If the target program counter value is less than or equal to the MINRC value, then next instruction generator 42 may select the target program counter value as the program counter value to load into program counter 28. On the other hand, if the target program counter value is not less than or equal to the MINRC value, then next instruction generator 42 may select the MINRC value as the program counter value to load into program counter 28. In this way, a "least-valued address first" processing order for the threads is maintained.

For a backward branch instruction, next instruction generator 42 may determine whether the branch condition for the backward branch instruction is uniformly not satisfied. If the branch condition for the backward branch instruction is uniformly not satisfied, then next instruction generator 42 may select a program counter value that corresponds to a next sequential instruction as the program counter value to load into program counter 28. On the other hand, if the branch condition for the backward branch instruction is uniformly satisfied or divergent, then next instruction generator 42 may select a target program counter value indicative of the target instruction specified by the backward branch instruction as the program counter value to load into program counter 28.

For forward branch instructions, next instruction generator 42 may determine whether the branch condition for the forward branch instruction is uniformly not satisfied or divergent. If the branch condition for the forward branch instruction is uniformly not satisfied or divergent, then next instruction generator 42 may select a program counter value that corresponds to a next sequential instruction as the program counter value to load into program counter 28. If the branch condition for the forward branch instruction is uniformly satisfied, then next instruction generator 42 may, in some examples, select a program counter value that corresponds to a next sequential instruction as the program counter value to load into program counter 28. In response to processing a forward branch instruction where the branch condition is uniformly satisfied, control flow module 34 may, in some examples, deactivate all of the threads, and sequentially increment the program counter value until the first of a resume counter value for an inactive thread is reached or the target program counter value for the branch instruction is reached. In this way, a "least-valued address first" processing order for the threads is maintained.

In further examples, for a forward branch instruction that is uniformly satisfied, control flow module 34 may select a program counter value to load into program counter 28 based on a MINRC value stored in a MINRC register (not shown). For example, next instruction generator 42 may, in such examples, determine whether the target program counter value is less than or equal to the MINRC value. If the target program counter value is less than or equal to the MINRC value, then next instruction generator 42 may select the target program counter value as the program counter value to load into program counter 28. On the other hand, if the target program counter value is not less than or equal to the MINRC value, then next instruction generator 42 may select the MINRC value as the program counter value to load into program counter 28. In this way, a "least-valued address first" processing order for the threads is maintained.

Active flag registers 44 store a plurality of active flags for the threads executing in processing system 10. Each of the active flags may correspond to a respective one of the threads executing in processing system 10, and may be indicative whether the thread is active (i.e., activated) or inactive (i.e., deactivated). In some examples, each of the active flags may be a single bit and active flag registers 44 may be one or more registers configured to store bits corresponding to all of the active flags. For example, each bit position in one or more registers may correspond to an active flag. Active flag registers 44 are communicatively coupled to thread state manager 48.

Resume counter registers 46 store a plurality of resume counter values for the threads executing in processing system 10. Each of the resume counter values may correspond to a respective one of the threads executing in processing system 10 and may be indicative of a program counter value at which the respective thread is scheduled to be reactivated if the respective thread is inactive. If the thread is active, the resume counter value is set to a default value, which in some cases may be a value that is greater than the range of valid program counter values used to execute programs. For example, if the thread is active, the resume counter may be set to a value that is a maximum value (i.e., a value that is the largest value that can be represented in a storage slot or register for the resume counter). Because the resume counter value for a corresponding thread is set to a default value when the thread is active, each resume counter value may also be indicative of whether a thread corresponding to the respective resume counter is active or inactive. Each of the resume counter values may be initialized to the default value when processing system 10 begins executing a program.

In some examples, resume counter registers 46 may include a plurality of registers configured to store a plurality of resume counter values. For example, each register may be a resume counter register that is configured to store a resume counter value for a respective one of the plurality of threads executing in processing system 10. Resume counter registers 46 are communicatively coupled to thread state manager 48.

Thread state manager 48 is configured to manage the state of the threads executing in processing system 10. For example, thread state manager 48 may activate and deactivate threads executing in processing system 10, and update active flags 44 and resume counter registers 46 as appropriate. Thread state manager 48 may include a thread deactivator 50 and a resume check module 52.

Thread deactivator 50 is configured to deactivate one or more threads in response to processing system 10 executing a branch instruction with a divergent branch condition. For example, thread deactivator 50 may receive information indicative of whether a divergent branch condition has taken place from branch condition evaluator 40, information indicative of whether the branch instruction is a forward branch instruction or a backward branch instruction from either branch condition evaluator 40 or decode module 32, and information indicative of which threads satisfied the branch condition and which threads did not satisfy the branch condition. Thread deactivator 50 may determine whether the divergent branch instruction is a forward branch instruction or a backward branch instruction. If the divergent branch instruction is a forward branch instruction, then thread deactivator 50 may deactivate each active thread that satisfied the branch condition. If the divergent branch instruction is a backward branch instruction, then thread deactivator 50 may deactivate each active thread that did not satisfy the branch condition.

For each thread being deactivated, thread deactivator 50 may set a resume counter value stored in resume counter registers 46 that corresponds to the respective thread to a value indicative of a program counter value at which the respective thread should be reactivated. When deactivating a thread in response to a divergent forward branch instruction, thread deactivator 50 may set the resume counter value for the thread to a value indicative of a target program counter value specified by the forward branch instruction. When deactivating a thread in response to a divergent backward branch instruction, thread deactivator 50 may set the resume counter value for the thread to a value indicative of a program counter value that corresponds to a next sequential instruction.

In some examples, to deactivate a particular thread, thread deactivator 50 may deactivate a respective one of processing elements 14 that corresponds to the particular thread. In additional examples, to deactivate a particular thread, thread deactivator 50 may send a signal to a portion of data store 16 that corresponds to the particular thread indicating that data store 16 should not store any computational results that correspond to the particular thread. When deactivating threads, thread deactivator 50 may, in some examples, set an active flag (within active flag registers 44) that corresponds to the thread to be deactivated to a value that indicates that the thread has been deactivated.

Resume check module 52 may be configured to perform a resume check operation to determine whether any deactivated threads are scheduled to be reactivated at the current program counter value for the current instruction cycle. In some examples, to perform the resume check operation, resume check module 52 may compare each of a plurality of resume counter values to a program counter value associated with a currently processed instruction (i.e., the program counter value that is currently loaded into program counter 28), and determine whether each of the resume counter values is equal to the current program counter value stored in program counter 28. If a resume counter value for a particular thread equals the current program counter value, then resume check module 52 may reactivate the thread. Otherwise, if the resume counter value for a particular thread does not equal the current program counter value, then resume check module 52 may maintain the deactivated status of the thread.

For each thread being reactivated, resume check module 52 may set a resume counter value corresponding to the respective thread to a default value that indicates that the thread is active. For example, the default value may be a largest value that can be represented for the resume counter value in one of resume counter registers 46.

In some examples, to reactivate a particular thread, resume check module 52 may activate a respective one of processing elements 14 that corresponds to the particular thread. In further examples, to reactivate a particular thread, resume check module 52 may send a signal to a portion of data store 16 that corresponds to the particular thread indicating that data store 16 should store computational results that correspond to the particular thread. When reactivating threads, resume check module 52 may, in some examples, set an active flag corresponding to the thread to a value that indicates that the thread has been activated.

In some examples, resume check module 52 may be selectively enabled or disabled based on configuration information provided by resume check activation module 54. For a given instruction cycle, if resume check module 52 is enabled for the instruction cycle, resume check module 52 may perform a resume check operation during the instruction cycle. Similarly, if resume check module 52 is disabled for the instruction cycle, resume check module 52 may not perform a resume check operation during the instruction cycle.

During instruction cycles where resume check module 52 is enabled to perform the resume check operation, resume check module 52 may initiate the resume check operation in response to loading a program counter value into program counter 28. In some examples, during a given instruction cycle, a resume check operation may be performed prior to a main operation if the resume check operation is performed. The main operation may be the operation that is specified in the instruction processed during the instruction cycle (e.g., an arithmetic operation, a logic operation, a control flow operation, etc.).

The instruction cycle may, in some examples, be of sufficient length to allow processing elements 14 to perform computational operations for any threads that have been reactivated as part of the resume check operation after the resume check operation has been completed. In further examples, execution of the instruction corresponding to the program counter value stored in program counter 28 may be delayed until after the resume check operation is complete and any threads that are scheduled to be reactivated for the instruction are activated. In such examples, after the resume check operation is complete, resume check module 52 may cause processing elements 14 to begin performing any computational operations associated with the current instruction.

Resume check activation module 54 is configured to selectively activate (i.e., enable or disable) resume check module 52 for a given instruction cycle based on information included in an instruction to be executed during the instruction cycle. The information included in the instruction may be indicative of whether a resume check operation is to be performed for the instruction. Resume check activation module 54 may determine if the information included in the instruction indicates that a resume check operation is to be performed for the instruction. If the information included in the instruction indicates that a resume check operation is to be performed for the instruction, then resume check activation module 54 may enable resume check module 52 for the instruction cycle during which the instruction is executed by control flow module 34. Enabling resume check module 52 for an instruction cycle may cause resume check module 52 to perform the resume check operation during the instruction cycle. If the information included in the instruction indicates that the resume check operation is not to be performed for the instruction, then resume check activation module 54 may disable resume check module 52 for the instruction cycle during which the instruction is executed by control flow module 34. Disabling resume check module 52 for an instruction cycle may cause resume check module 52 to not perform the resume check operation during the instruction cycle. In this manner, resume check activation module 54 may selectively enable or disable the performance of a resume check operation for an instruction based on information included in the instruction.

Figure 4:
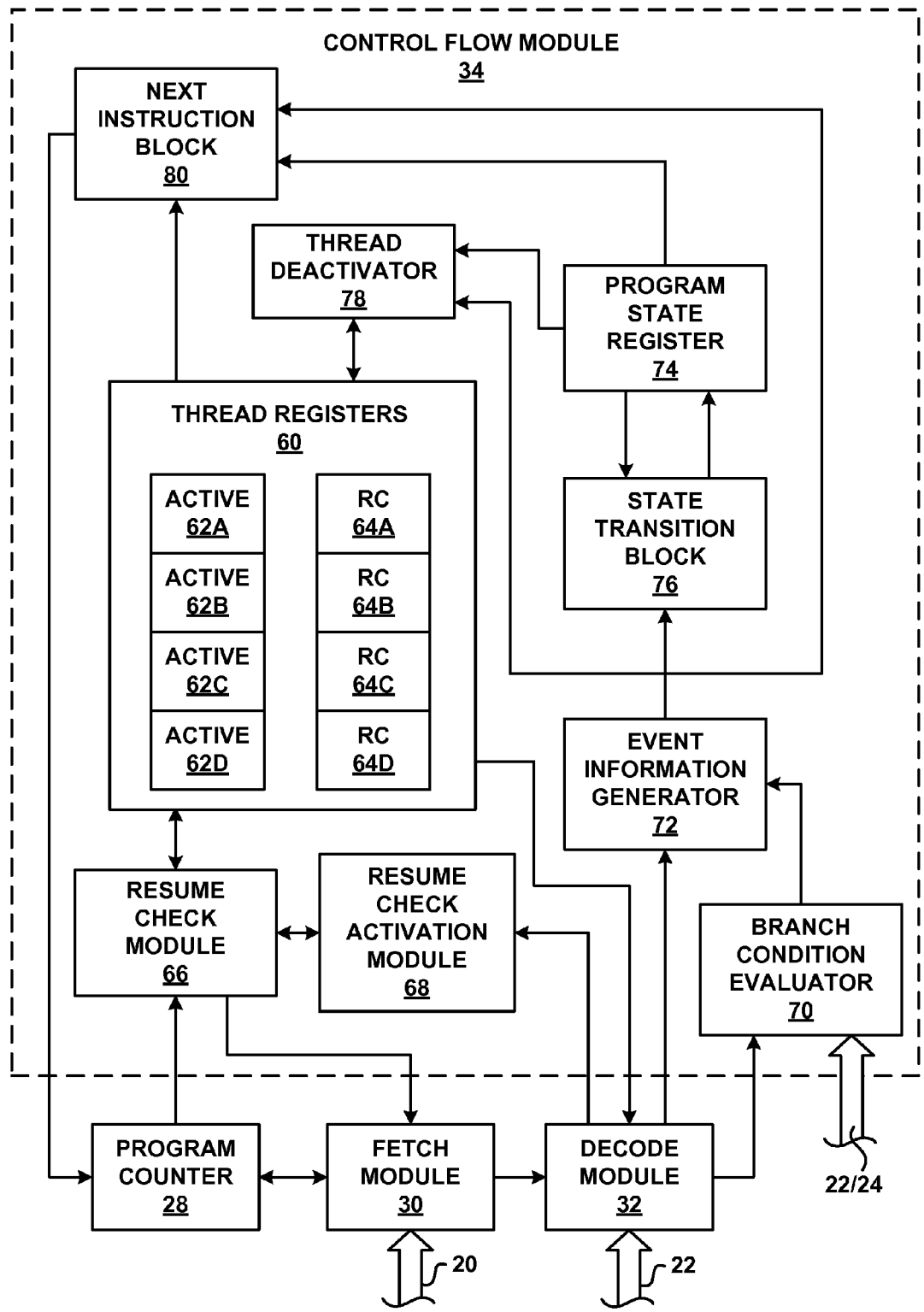
FIG. 4 is a block diagram illustrating another example control flow module that may be used to implement the selective resume check activation techniques of this disclosure.

FIG. 4 is a block diagram illustrating an example control flow module 34 that may be used to implement the selective resume check activation techniques of this disclosure. In some examples, the example control flow module 34 illustrated in FIG. 4 may be used to implement the control flow modules 34 described above with respect to FIGS. 2 and 3 and/or part of the control unit 12 described above with respect to FIG. 1. Control flow module 34 includes thread registers 60, active flags 62A-62D (collectively "active flags 62"), resume counters 64A-64D (collectively "resume counters 64"), a resume check module 66, a resume check activation module 68, a branch condition evaluator 70, an event information generator 72, a program state register 74, a state transition block 76, a thread deactivator 78 and a next instruction block 80.

In examples where control flow module 34 illustrated in FIG. 4 is used to implement control flow module 34 shown in FIG. 3, active flags 62 shown in FIG. 4 may correspond to active flag registers 44 shown in FIG. 3, resume counters 64 shown in FIG. 4 may correspond to resume counter registers 46 shown in FIG. 3, branch condition evaluator 70 shown in FIG. 4 may correspond to branch condition evaluator 40 shown in FIG. 3, resume check module 66 shown in FIG. 4 may correspond to resume check module 52 shown in FIG. 3, and resume check activation module 68 shown in FIG. 4 may correspond to resume check activation module 54 shown in FIG. 3. Accordingly, in the interest of brevity and to avoid redundancy, the construction and operation of these shared components is not described in further detail.

Further, in examples where control flow module 34 illustrated in FIG. 4 is used to implement control flow module 34 shown in FIG. 3, event information generator 72, program state register 74, state transition block 76 and next instruction block 80 may be configured to implement the functionality of next instruction generator 42 shown in FIG. 3. Similarly, event information generator 72, program state register 74, state transition block 76, and thread deactivator 78 may be configured to implement the functionality of thread deactivator 50 shown in FIG. 3.

Thread registers 60 are configured to store the thread state for each of the threads executing in processing system 10. As shown in FIG. 4, thread registers 60 include active flags 62 and resume counters 64. Each of active flags 62 stores an active flag indicative of whether a thread corresponding to the respective active flag 62A-62D is active. Each of resume counters 64 stores a resume counter value for a respective thread. In some examples, each thread may be assigned to a respective one of processing elements 14. In such examples, each of active flags 62 and resume counters 64 may correspond to a respective one of processing elements 14. For example, active flag 62A and resume counter 64A may each correspond to processing element 14A illustrated in FIG. 1, and active flag 62B and resume counter 64B may each correspond to processing element 14B illustrated in FIG. 1. Although the example control flow module 34 illustrated in FIG. 4 illustrates a system having four active flags 62 and four resume counters 64, in other examples, control flow module 34 may have the same or different numbers of active flags 62 and resume counters 64.

Resume check module 66 is configured to perform a resume check operation during instruction cycles for which resume check module 66 is enabled by resume check activation module 68. When enabled, resume check module 66 may perform a resume check operation in response to program counter 28 being loaded with a new program counter value. In some examples, resume check module 66 may perform the resume check operation in accordance with the resume check techniques illustrated in FIGS. 9 and 10. To perform the resume check operation, resume check module 66 may receive the current program counter value from program counter 28, the current thread activation status from active flags 62, and the current resume counter values from resume counters 64. Resume check module 66 may modify active flags 62 and resume counters 64 as part of the resume check operation. In addition, resume check module 66 may update program state register 74 based on the outcome of the resume check operation. When not enabled for an instruction cycle, resume check module 66 may refrain from performing a resume check operation during the instruction cycle.

Resume check activation module 68 may be configured to selectively enable and disable resume check module 66 based on information included in an instruction to be processed during the current instruction cycle. The information included in the instruction may be indicative of whether the resume check operation is to be performed for the instruction to be processed during the current instruction cycle.

When resume check module 66 is enabled, after completing the resume check operation, resume check module 66 may send a signal to one or both of fetch module 30 and decode module 32 indicating that the resume check operation has completed. When fetch module 30 receives the signal that the resume check operation has completed, fetch module 30 may forward the fetched instruction to decode module 32 for further processing. In response to receiving the instruction, decode module 32 may check active flags 62 and update the active and inactive status of processing elements 14 based the current state of active flags 62, which may have been modified by the resume check operation. If the instruction is of a type that is issuable to processing elements 14, decode module 32 may issue the instruction to processing elements 14 in conjunction with or after updating the active and inactive status of processing elements 14. Although the example control flow module 34 illustrates resume check module 66 as signaling fetch module 30 upon completion of the resume check operation, in other examples, resume check module 66 may send the signal indicating that the resume check has completed to decode module 32. In such examples, when decode module 32 receives the signal, decode module 32 may check active flags 62 and update the active and inactive status of processing elements 14 based the current state of active flags 62.

When decode module 32 decodes instruction, if decode module 32 determines that the instruction is a branch instruction (i.e., a conditional branch instruction), then decode module 32 may send a signal to branch condition evaluator 70 indicating that the current instruction is a conditional branch instruction and provide information indicative of the branch condition to branch condition evaluator 70 for further processing. In some examples, if decode module 32 determines that the instruction is not a branch instruction (e.g., a jump instruction or a sequential instruction), then decode module 32 may send a signal to branch condition evaluator 70 indicating that the current instruction is not a conditional branch instruction.

Decode module 32 provides control information to event information generator 72 for further processing. In some examples, the control information may be the instruction itself. In further examples, the control information may include information, such as, e.g., information indicative of whether the instruction is a control flow instruction or a sequential instruction; if the instruction is a control flow instruction, information indicative of whether the instruction is a branch instruction or a jump instruction; and if the instruction is a branch or jump instruction, information indicative of whether the branch or jump instruction is a forward or backward branch or jump instruction; and if the instruction is a branch instruction, information specifying the branch condition.

If the currently processed instruction is a conditional branch instruction, branch condition evaluator 70 may evaluate the branch condition for each active thread. In some examples, branch condition evaluator 70 may receive the result of a comparison operation or a zero check operation from processing elements 14 via communication path 22. In further examples, branch condition evaluator 70 may access one or more registers in data store 18, via communication path 24, and perform a comparison operation or a zero check operation. In any case, branch condition evaluator 70 may determine whether the branch condition is satisfied or not satisfied for each active thread. In some examples, branch condition evaluator 70 may forward information indicative of whether the branch condition is satisfied or not satisfied for each active thread to event information generator 72. In additional examples, branch condition evaluator 70 may determine whether the branching divergence for the current instruction is uniform or divergent and forward information indicative of whether the branching divergence is uniform or divergent to event information generator 72. In further examples, if the branching divergence is uniform for the branch instruction, branch condition evaluator 70 may determine whether the branch condition is uniformly satisfied or uniformly not satisfied, and forward information indicative of whether the branch condition is uniformly satisfied or uniformly not satisfied to event information generator 72.

Event information generator 72 receives control information from decode module 32 and, if the currently processed instruction is a branch instruction, branch condition information from branch condition evaluator 70. In some examples, event information generator 72 may also receive branching divergence information from branch condition evaluator 70 if the currently processed instruction is a branch instruction. If event information generator 72 does not receive branching divergence information from branch condition evaluator 70, then event information generator 72 may determine whether the branching divergence for the current instruction is uniform or divergent. Event information generator 72 generates events based on the received information, and provides the events to state transition block 76, thread deactivator 78 and next instruction block 80.

In some examples, event information generator 72 may generate the following events:
- Jb: Jump backward instruction
- Jf: Jump forward instruction
- BbuT: Branch backward instruction, all threads are uniform, condition is true
- BbuF: Branch backward instruction, all threads are uniform, condition is false
- BfuT: Branch forward instruction, all threads are uniform, condition is true
- BfuF: Branch forward instruction, all threads are uniform, condition is false
- Bbd: Branch backward instruction, threads are divergent
- Bfd: Branch forward instruction, threads are divergent
- S: Sequential instruction According to the above-identified events, an instruction may be a sequential instruction (S), a jump instruction (J), or a branch instruction (B). For jump or branch instructions, the jump or branch direction may be either backward (b) or forward (f). For branch instructions, the branching divergence may be either uniform (u) or divergent (d). For branch instructions, the branching condition may be either true (T) or false (F). A true branch condition may correspond to a satisfied branch condition, and a false branch condition may correspond to an unsatisfied branch condition.

Program state register 74 may store a program state for the program executing in processing system 10. In some examples, program state register 74 may store the following three states:
State 0: All threads are active.
State 1: At least one thread is active and at least one thread is inactive.
State 2: All threads are inactive.

In some examples, processing system 10 may be configured such that the initial state and final state of a program are each state 0.

State transition block 76 may receive an event from event information generator 72 and a current program state from program state register 74, generate a new program state based on the received event and the current program state, and store the new program state in program state register 74. State transition block 76 may generate the new program state in accordance with the state transition table described in further detail with respect to FIG. 5.

Thread deactivator 78 may receive an event from event information generator 72 and a current program state from program state register 74, determine whether to deactivate one or more threads based on the event and the current program state, and deactivate one or more threads in response to certain combinations of events and current program states. When deactivating threads, thread deactivator 78 may update active flags 62 and resume counters 64 for the threads being deactivated. Thread deactivator 78 may deactivate threads in accordance with the state transition table described in further detail with respect to FIG. 5.

Next instruction block 80 may receive an event from event information generator 72 and a current program state from program state register 74, determine a new program counter value to load into program counter 28, and load the new program counter value into program counter 28. The new program counter value may be indicative of a next instruction to be processed by control unit 12. Next instruction block 80 may determine the new program counter value in accordance with the state transition table described in further detail with respect to FIG. 5.

As discussed above, resume check module 66 may update program state register 74 based on the outcome of the resume check operation. This update may be performed by resume check module 66 in an asynchronous manner. For example, if the program state was State 1 prior to performing the resume check operation, and all inactive threads are reactivated, program state register 74 may change program state register 74 to State 0 in an asynchronous fashion to reflect that all threads are activated. It should be noted that state transition block 76 generates the new program state based on the current program state that is available after any updating by resume check module 66. Similarly, thread deactivator 78 determines whether to deactivate one or more threads based on the current program state that is available after any updating by resume check module 66, and next instruction block 80 determines a new program counter value based on the current program state that is available after any updating by resume check module 66. As such, although the program state may change between two different states during a single processing cycle due to a resume check, the final state for the processing cycle, i.e., the state that occurs after the resume check is complete, is used as the current program state for processing by each of state transition block 76, thread deactivator 78 and next instruction block 80.

FIG. 5 is a state transition table that characterizes exemplary operation of the control flow module 34 illustrated in FIG. 4 according to this disclosure. The state transition table in FIG. 5 includes an "OLD STATE" column, which represents the current program state, and a "NEW STATE" column, which represents either a new program state for a next processing cycle or a program state that occurs after an asynchronous transition due to a resume check operation. The state transition table also includes an "EVENT" column, which includes the events generated by event information generator 72. The indicator "n/a" in the "EVENT" column signifies that the state transition and action occur due to a resume check operation and that the event is irrelevant for such a transition. The state transition table also includes an "ACTION" column that indicates what action takes place in response to a particular combination of a current program state and an event. The action labeled "Resume" in the "ACTION" column signifies that an asynchronous state transition occurs due to a resume check operation.

As shown in FIG. 5, state transition block 76 selects State 0 as the new state to load into program state register 74 in response to the current state being State 0 and receiving an S event, a Jf event, a Jb event, a BfuT event, a BfuF event, a BbuT event, or a BbuF event. State transition block 76 selects State 1 as the new state to load into program state register 74 in response to the current state being State 0 and receiving a Bbd event or a Bfd event. State transition block 76 also selects State 1 as the new state to load into program state register 74 in response to the current state being State 1 and receiving an S event, a Jb event, a BbuF event, a BbuT event, a BfuF event, a Bbd event or a Bfd event. State transition block 76 selects State 2 as the new state to load into program state register 74 in response to the current state being State 1 and receiving a Jf event or a BfuT event. State transition block 76 also selects State 2 as the new state to load into program state register 74 in response to the current state being State 2 and receiving any event. In response to reactivating one or more threads as part of a resume check operation, state transition block 76 may transition into State 0 or State 1 in an asynchronous manner.

As also shown in FIG. 5, thread deactivator 78 may determine to deactivate one or more threads in response to the current state being either State 0 or State 1 and receiving a Bbd event or a Bfd event. The Bbd event and Bfd events may be referred to as divergence events resulting from the evaluation of a branch condition for a branch instruction. Thread deactivator 78 may determine to deactivate all active threads that do not satisfy the branch condition (i.e., a false condition) in response to receiving a Bbd event, and to deactivate all active threads that satisfy the branch condition (i.e., a true condition) in response to receiving a Bfd event. Thread deactivator 78 may determine to deactivate all active threads in response to the current state being State 1 and receiving a Jf event or a BfuT event.

As shown in FIG. 5, next instruction block 80 may select one of a program counter value indicative of the next sequential instruction (i.e., "PC+1") or a program counter value indicative of a target instruction (i.e., a target program counter value) to load into program counter 28 in response to various combinations of current program state and events. For example, next instruction block 80 may select a program counter value indicative of the next sequential instruction (i.e., "PC+1") to load into program counter 28 in response to the current state being State 0 and receiving an S event, a BfuF event, a BbuF event, or a Bfd event. Next instruction block 80 may also select a program counter value indicative of the next sequential instruction (i.e., "PC+1") to load into program counter 28 in response to the current state being State 1 and receiving an S event, a BbuF event, a BfuF event, a Bfd event, a Jf event, or a BfuT event. Next instruction block 80 may also select a program counter value indicative of the next sequential instruction (i.e., "PC+1") to load into program counter 28 in response to the current state being State 2 and receiving any event. Next instruction block 80 may select a program counter value indicative of a target instruction (i.e., a target program counter value) to load into program counter 28 in response to the current state being State 0 and receiving a Jf event, a Jb event, a BfuT event, a BbuT event, or a Bbd event. Next instruction block 80 may also select a program counter value indicative of a target instruction (i.e., a target program counter value) to load into program counter 28 in response to the current state being State 1 and receiving a Jb event, a BbuT event, or a Bbd event.

Figure 6:
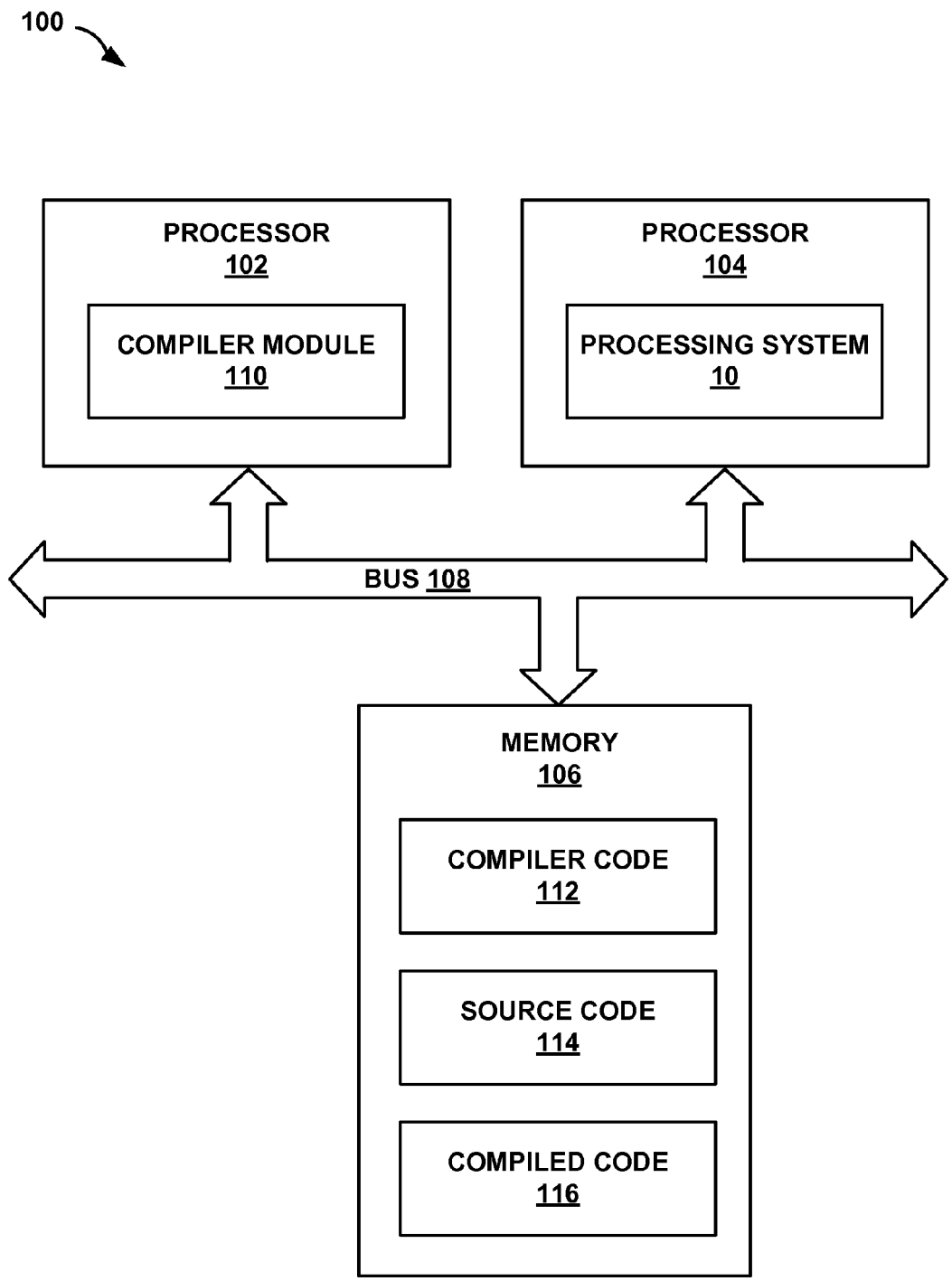
FIG. 6 is a block diagram illustrating an example computing system that may be used to implement the selective resume check activation techniques of this disclosure.

FIG. 6 is a block diagram illustrating an example computing system 100 that may be used to implement the selective resume check activation techniques of this disclosure. Computing system 100 includes processors 102, 104, a memory 106, and a bus 108. Processors 102, processor 104, and memory 106 may be communicatively coupled to each other via bus 108. Bus 108 may be any of a variety of bus structures or other communication structures, such as, e.g., a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 6 is merely exemplary, and other configurations of computing devices and/or computing systems with the same or different components may be used to implement the techniques of this disclosure.

Processors 102 and 104 may each correspond to one or more processors. The one or more processors may be any type of general-purpose processor or special-purpose processor. In some examples, processor 102 may be an application processor, host processor and/or central processing unit (CPU). In further examples, processor 104 may be a graphics processing unit (GPU). In such examples, the GPU may be configured to accelerate the processing of graphics operations and/or to perform general-purpose computing tasks (e.g., a general-purpose computing on graphics processing unit (GPGPU) task) at the direction of processor 102. Processor 102 is configured to execute a compiler module 110. Processor 104 may include processing system 10, which may correspond to the processing system 10 described in FIG. 1 of this disclosure. Although processors 102 and 104 are illustrated in FIG. 6 as being different processors, in other examples, processors 102 and 104 may be the same processor.

Memory 106 may be configured to store program modules and/or instructions that are accessible for execution by processors 102, 104 and/or to store data for use by the programs executing on processors 102 and 104. Memory 106 may be formed from one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media. Memory 106 includes compiler code 112, source code 114 and compiled code 116.

Compiler module 110 may be configured to compile source code 114 to generate compiled code 116 based on a compilation technique that is included in compiler code 112. In other words, compiler module 110 may be a runtime execution instance of compiler code 112 that is executing on processor 102.

Source code 114 may correspond to a program to be executed by processor 104 and/or processing system 10. Compiled code 116 may be a compiled version of source code 114. In some examples, the compiled version may be object code, byte code, and/or machine-language code that is capable of being executed by processor 104 and/or processing system 10.

According to this disclosure, compiler module 110 may be configured to generate compiled code 116 such that compiled code 116 includes one or more instructions that each include information indicative of whether a resume check operation is to be performed for the respective instruction when executed by a processor that executes compiled code 116 (e.g., processor 104 and/or processing system 10). In some examples, the information included in the instruction may be an information field, such as, e.g., a one-bit flag that instructs a processor that executes the instruction of whether to perform a resume check operation for the instruction. In additional examples, the information included in the instruction may take on other forms, such as, particular operational code (i.e., opcode) parameters, combinations of bits, etc.

In some examples, compiler module 110 may be configured to selectively cause a resume check operation to be performed during the execution of compiled code 116 for particular instructions on an instruction-by-instruction basis. For example, compiler module 110 may select one or more instructions as being instructions for which a resume check operation is to be performed when a program specified by source code 114 is executed, and generate compiled code 116 for the program such that the compiled code includes the selected one or more instructions and such that the selected one or more instructions include information indicating that the resume check operation is to be performed for the selected one or more instructions. As another example, compiled code 116 may select one or more instructions as being instructions for which a resume check operation is not to be performed when a program specified by source code 114 is executed, and generate compiled code 116 for the program such that the compiled code includes the selected one or more instructions and such that the selected one or more instructions include information indicating that the resume check operation is not to be performed for the selected one or more instructions In further examples, compiler module 110 may be configured to select an instruction as being an instruction for which a resume check operation is to be performed when a program is executed if the instruction is a candidate next instruction to be executed by one or more threads that are deactivated in response to executing at least one of a branch instruction or a jump instruction. A candidate next instruction may refer to an instruction where such deactivated threads would be scheduled to be reactivated in response to executing the branch instruction or the jump instruction. For example, for a forward branch instruction and a forward jump instruction, the candidate next instruction may be a target instruction of the forward jump instruction or the forward branch instruction. As another example, for a backward branch instruction the candidate next instruction may be a next sequential instruction after the backward branch instruction.

A branch instruction may refer to a control flow instruction that specifies a next instruction to be executed for each of one or more threads based on whether a branch condition is satisfied for the respective thread. The branch instruction may include a field that specifies a target instruction and a field that specifies a branch condition for branching to the target instruction. For each of the threads executing the branch instruction, if a respective thread satisfies the branch condition, then the branch instruction may specify the target instruction as a next instruction to be executed by the respective thread. On the other hand, if the respective thread does not satisfy the branch condition, then the branch instruction may specify the next sequential instruction as a next instruction to be executed by the respective thread. The next sequential instruction may occur immediately after the branch instruction in the ordered sequence of instructions.

A forward branch instruction may refer to a branch instruction where the target instruction specified in the branch instruction occurs after the branch instruction in an ordered sequence of instructions that forms a program that includes the branch instruction. A backward branch instruction may refer to a branch instruction where the target instruction specified in the branch instruction occurs prior to a next sequential instruction in an ordered sequence of instructions that forms a program that includes the branch instruction.

A jump instruction may refer to a control flow instruction that unconditionally specifies a next instruction to be executed for each of one or more threads. The jump instruction may include an information field that specifies a target instruction and, in some examples, may not include a field that specifies a condition for jumping to the target instruction. The jump instruction may unconditionally specify the target instruction as the next instruction to be executed by each of the threads that executes the jump instruction.

Similar to the forward and backward branch instructions, a forward jump instruction may refer to a jump instruction where the target instruction specified in the jump instruction occurs after the jump instruction in an ordered sequence of instructions that forms a program that includes the jump instruction. A backward jump instruction may refer to a jump instruction where the target instruction specified in the jump instruction occurs prior to a next sequential instruction in an ordered sequence of instructions that forms a program that includes the jump instruction. The next sequential instruction may occur immediately after the jump instruction in the ordered sequence of instructions.

As discussed above, to ensure that proper control flow is maintained in a processing system that uses a resume counter-based approach for thread reactivation, processing system 10 may use a "least-valued address first" thread processing order. In general, the "least-valued address first" thread processing order may refer to a processing order where threads that are scheduled to process instructions at lower-valued addresses are executed prior to threads that are scheduled to process instructions at higher-valued addresses. The "least-valued address first" thread processing order may differentiate which threads are deactivated in response to a divergent branch instruction based on the direction (i.e., forward or backward) of the branch instruction.

For example, for a divergent backward branch instruction, processing system 10 may deactivate threads for which the branching condition is not satisfied, set the resume counter value for each thread being deactivated to a value associated with a next sequential instruction that occurs after the branch instruction, load the program counter with a value associated with a target instruction specified by the branch instruction, and proceed to execute those threads for which the branching condition is satisfied. For a divergent forward branch instruction, processing system 10 may deactivate threads for which the branching condition is satisfied, set the resume counter value for each thread being deactivated to a value associated with a target instruction specified by the branch instruction, load the program counter with a value associated with a next sequential instruction that occurs after the branch instruction, and proceed to execute those threads for which the branching condition is not satisfied. Deactivating threads in this manner ensures that divergent threads that are scheduled to process instructions at lower-valued addresses execute prior to threads that are scheduled to process instructions at higher-valued addresses (i.e., a "least-valued address first" thread processing order).

In cases where one or more threads have already been deactivated and the remaining active threads execute either a forward jump instruction or a uniformly satisfied forward branch instruction (i.e., a forward branch instruction where the branching condition is uniformly satisfied for all active threads), one approach to handling the control flow may be to always jump to the target instruction specified in the forward jump or forward branch instruction because all active threads will remain active. Such an approach, however, does not guarantee a "least-valued address first" thread processing order. In particular, one or more inactive threads may, in some cases, have resume counter values that are between the current program counter value of the jump or branch instruction and the target program counter value (i.e., the program counter value associated with the target instruction specified in the branch or jump instruction). If the control flow were to jump over such inactive threads, it is possible that such threads would not be reactivated prior to finishing execution of the program.

To avoid such a situation, whenever a forward jump instruction or a uniformly satisfied forward branch instruction is executed, processing system 10 may be configured to deactivate all threads and sequentially increment the program counter value until the first of a resume counter value for an inactive thread is reached or the target program counter value for the jump or branch instruction is reached. In this way, a "least-valued address first" processing order for the threads is maintained.

In some examples, compiler module 110 may be configured to determine whether a resume check operation may need to be performed during the execution of a program for one or more instructions of the program in a processing system that utilizes a "least-valued address first" thread processing order as described above. In such examples, compiler module 110 may be configured to enable the resume check operation for instructions where it is determined that a resume check operation may need to be performed during the execution of the program, and to disable the resume check operation for instructions where it is determined that no threads will need to be reactivated during the execution of the program.

As one specific example, for divergent forward branch instructions, compiler module 110 may determine that, because all threads that satisfy the branch condition will be deactivated, a resume check operation should be performed for any instruction that is a target instruction of a forward branch instruction. For divergent backward branch instructions, compiler module 110 may determine that, because all threads that do not satisfy the branch condition will be deactivated, a resume check operation should be performed for any instruction that occurs immediately after a backward branch instruction (i.e., a next sequential instruction after the backward branch instruction). For forward jump instructions, compiler module 110 may determine that, because all threads may be deactivated to cycle through the program counter values until the first of a resume counter value for an inactive thread is reached or the target program counter value for the jump instruction is reached, a resume check operation should be performed for any instruction that is a target instruction of a forward jump instruction.

In this example, for any other instructions that were not identified as being a target instruction of a forward branch instruction or a forward jump instruction or as being a next sequential instruction after a backward branch instruction, compiler module 110 may determine that a resume check operation does not need to be performed for such instructions because any threads that are deactivated during the execution of the program will not need to be reactivated at such instructions. Not performing a resume check operation for such instructions may reduce the power consumption of and/or improve the performance of a SIMD processing system compared to a processing system where the resume check operation is performed for every instruction.

For instructions where it is determined that a resume check operation may need to be performed during the execution of the program, compiler module 110 may place information in the compiled instructions to indicate that a resume check operation is to be performed for the instructions. Similarly, for instructions where it is determined that a resume check operation need not be performed during the execution of the program, compiler module 110 may place information in the instructions to indicate that a resume check operation is not to be performed for the instructions.

FIGS. 7-10 are flow diagrams illustrating example instruction processing techniques for selectively activating and/or performing a resume check operation according to this disclosure. The example techniques shown in FIGS. 7-10 may be implemented, in some examples, in control flow module 34 of any of FIGS. 2-4 and/or within processing system 10 of any of FIGS. 1-4 and 6. For ease of explanation, the techniques will be described with respect to control flow module 34 shown in FIG. 2, but it should be understood that the techniques may be performed in other systems with the same or different components in the same or a different configuration.

Figure 7:
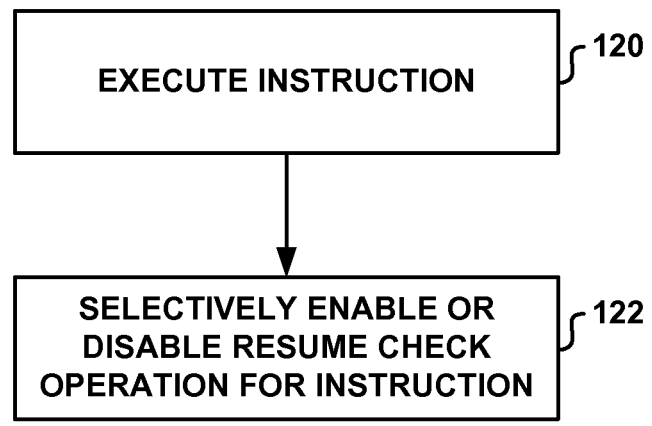
FIG. 7 is a flow diagram illustrating an example technique for selectively activating a resume check operation according to this disclosure.

FIG. 7 is a flow diagram illustrating an example technique for selectively activating a resume check operation according to this disclosure. Control flow module 34 executes an instruction that includes information indicative of whether a resume check operation is to be performed for the instruction (120). Control flow module 34 selectively enables or disables the resume check operation for the instruction based on the information included in the instruction (122).

The resume check operation may be an operation that includes comparing each of a plurality of resume counter values to a program counter value associated with the instruction. The resume check operation may further include, for each of the plurality of resume counter values, activating a respective one of the plurality of threads associated with the respective resume counter value if the respective resume counter value is equal to the program counter value. Each of the resume counter values may be associated with a respective one of a plurality of threads executing on a processor (e.g., processing system 10).

Figure 8:
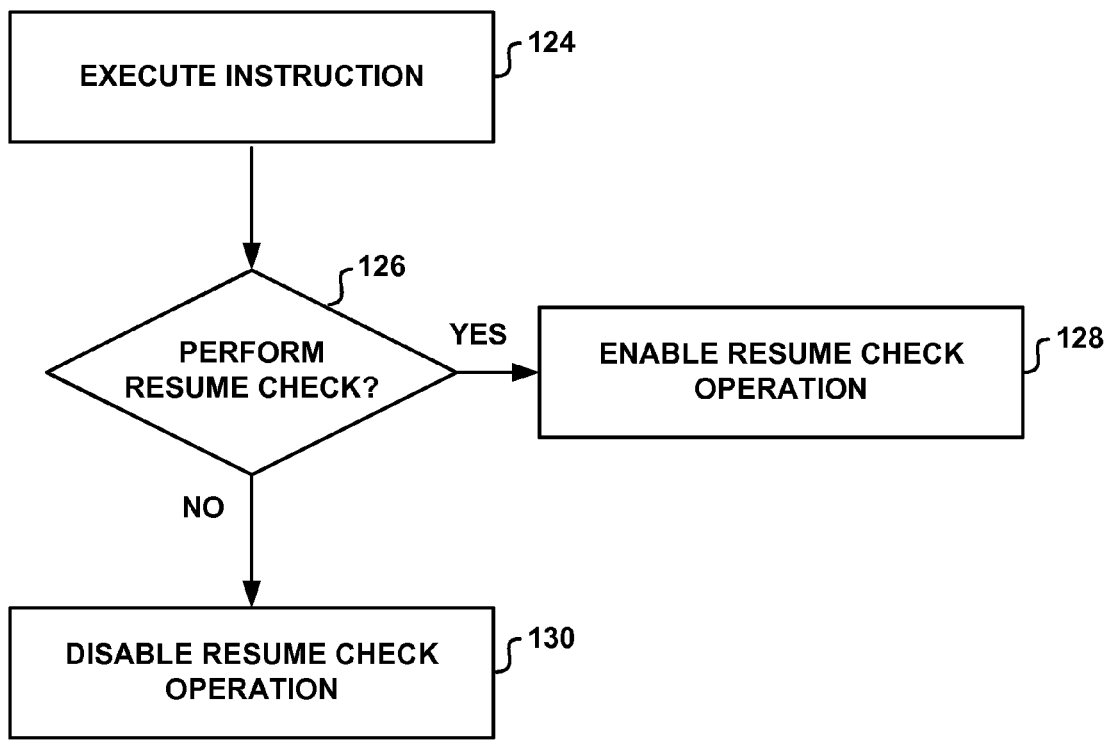
FIG. 8 is a flow diagram illustrating another example technique for selectively activating a resume check operation according to this disclosure.

FIG. 8 is a flow diagram illustrating another example technique for selectively activating a resume check operation according to this disclosure. Control flow module 34 executes an instruction during an instruction cycle (124). Control flow module 34 determines whether the information included in the instruction indicates that the resume check operation is to be performed for the instruction (126). Control flow module 34 enables the resume check operation for the instruction cycle in response to determining that the information included in the instruction indicates that the resume check operation is to be performed for the instruction (128). For example, control flow module 34 may cause the resume check operation to be performed during the instruction cycle. Control flow module 34 disables the resume check operation for the instruction cycle in response to determining that the information included in the instruction indicates that the resume check operation is not to be performed for the instruction (130). For example, control flow module 34 may cause the resume check operation to not be performed during the instruction cycle.

Figure 9:
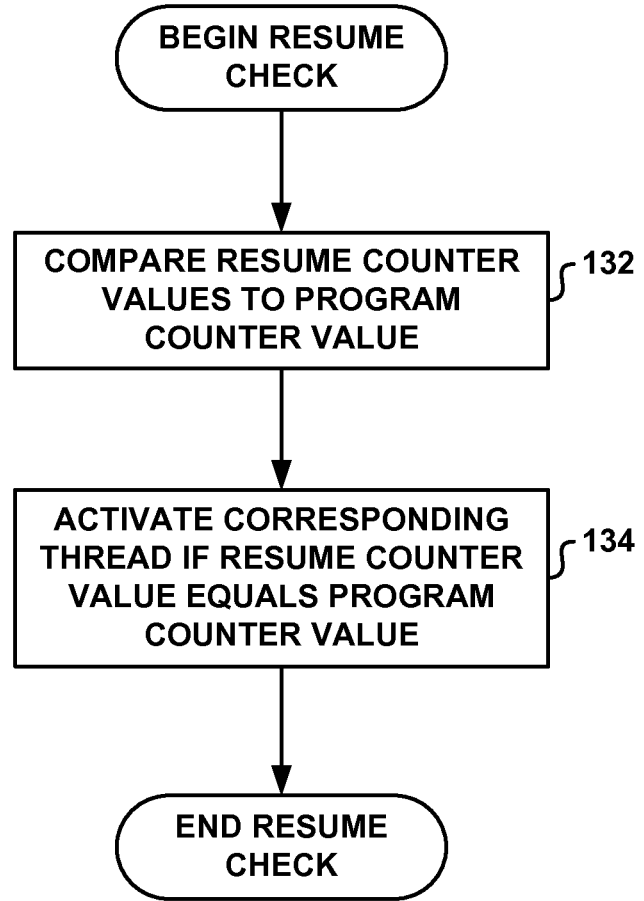
FIG. 9 is a flow diagram illustrating an example technique for performing a resume check operation according to this disclosure.

FIG. 9 is a flow diagram illustrating an example technique for performing a resume check operation according to this disclosure. Control flow module 34 compares each of a plurality of resume counter values to a program counter value associated with the instruction (132). Each of the resume counter values may be associated with a respective one of a plurality of threads executing on the processor. The program counter value may be a program counter value associated with the current instruction processing cycle. For each of the plurality of resume counter values, control flow module 34 activates a respective one of the plurality of threads associated with the respective resume counter value if the respective resume counter value is equal to the program counter value (134).

Figure 10:
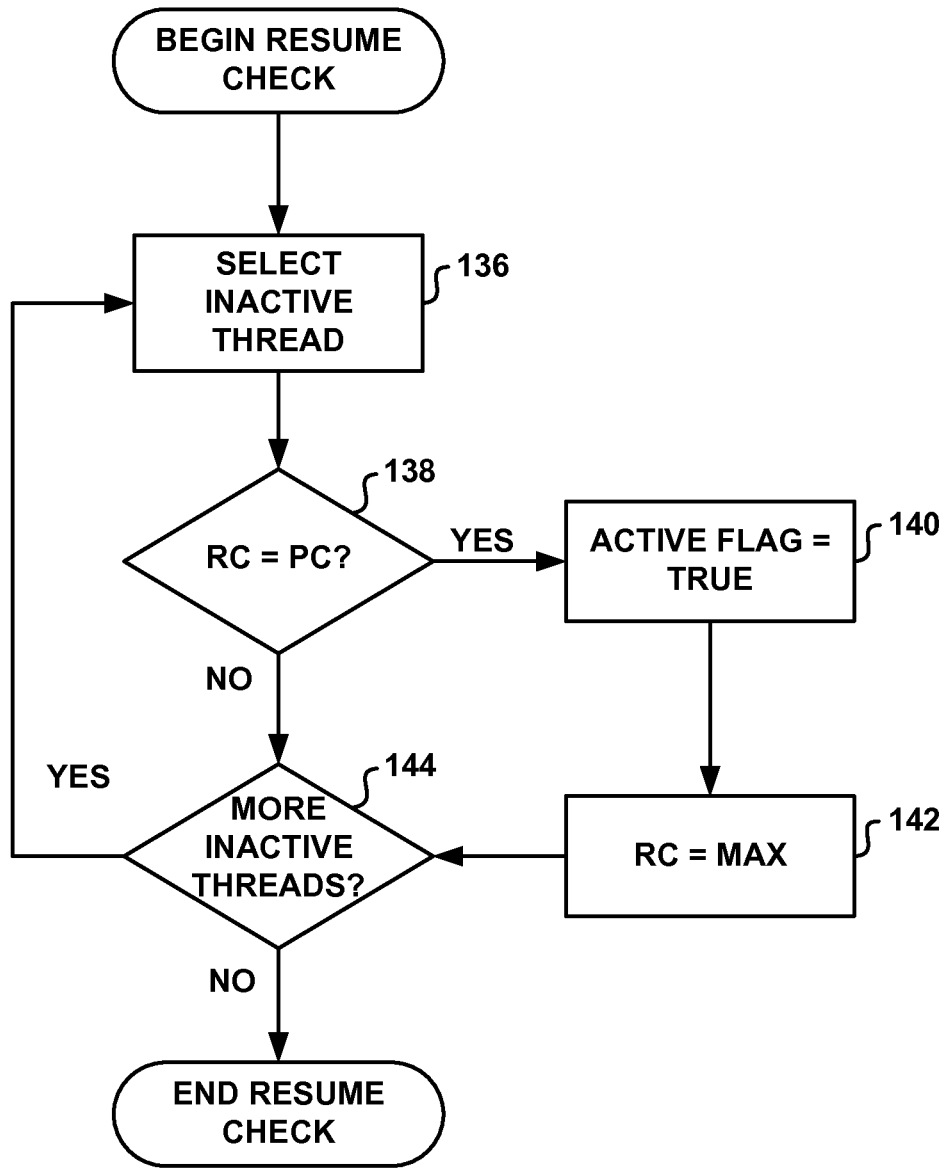
FIG. 10 is a flow diagram illustrating another example technique for performing a resume check operation according to this disclosure.

FIG. 10 is a flow diagram illustrating another example technique for performing a resume check operation according to this disclosure. Control flow module 34 selects an inactive thread (136). Control flow module 34 determines whether the resume counter value for the inactive thread is equal to the program counter value (138). If control flow module 34 determines that the resume counter value for the inactive thread is equal to the program counter value, then control flow module 34 sets the active flag associated with the thread to a value of true to indicate that the corresponding thread is now active (140), sets the resume counter associated with the thread to a maximum value (142), and proceeds to decision box 144. The maximum value, in some examples, may be a value that is the largest value that can be represented in the storage slot or register for the resume counter.

On the other hand, if control flow module 34 determines that the resume counter value for the inactive thread is not equal to the program counter value, then control flow module 34 proceeds to decision box 144 without setting the active flag for the thread and without setting the resume counter for the thread. In either case, control flow module 34 determines whether there are any more inactive threads to process (144). If control flow module 34 determines that there are more inactive threads to process, then control flow module 34 returns to process box 136 to process another inactive thread. Otherwise, if control flow module 34 determines that there are not any more inactive threads to process, then control flow module 34 ends the resume check operation. Although FIG. 10 illustrates an example resume check operation that processes and reactivates threads sequentially, in other examples, the threads may be processed and reactivated either partially or fully in parallel.

Figure 11:
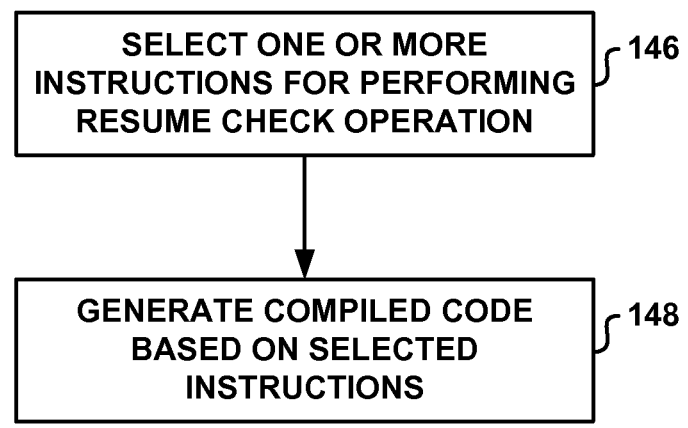
FIG. 11 is a flow diagram illustrating an example technique for generating compiled code that selectively activates a resume check operation according to this disclosure.
Figure 12:
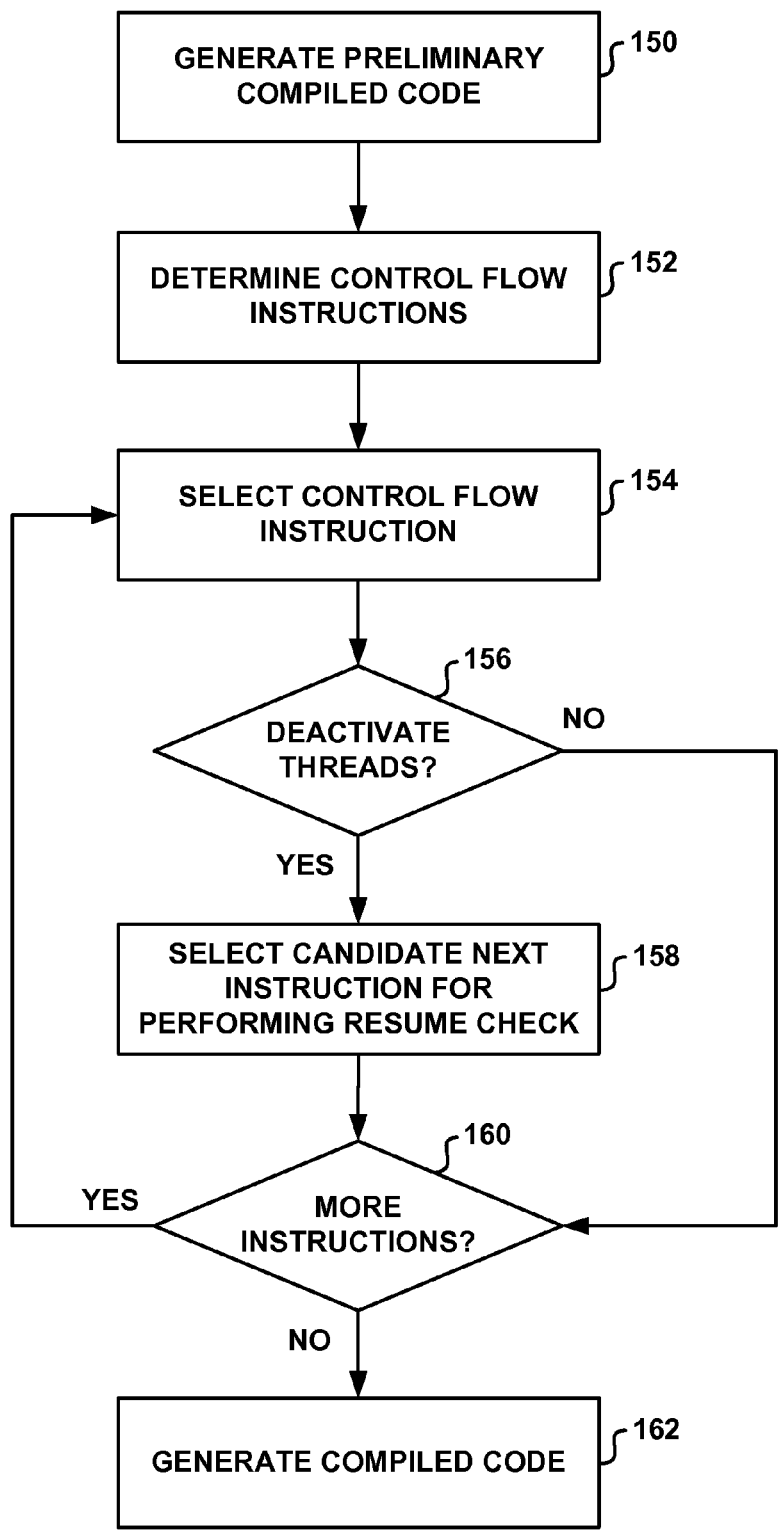
FIG. 12 is a flow diagram illustrating another example technique for generating compiled code that selectively activates a resume check operation according to this disclosure.

FIGS. 11 and 12 are flow diagrams illustrating example instruction processing techniques for generating compiled code that selectively activates a resume check operation according to this disclosure. For ease of explanation, the techniques will be described with respect to processor 102 (e.g., compiler module 110) of computing system 100 shown in FIG. 6, but it should be understood that the techniques may be performed by other components in the same or a different computing system.

FIG. 11 is a flow diagram illustrating an example technique for generating compiled code that selectively enables and disables a resume check operation according to this disclosure. Processor 102 selects one or more instructions of a program as being instructions for which a resume check operation is to be performed when the program is executed (146). Processor 102 generates compiled code for the program based on the selected one or more instructions (148). For example, processor 102 may generate compiled code for the program such that the compiled code includes the selected one or more instructions and such that the selected one or more instructions include information indicating that the resume check operation is to be performed for the selected one or more instructions.

In some examples, processor 102 may select an instruction as being an instruction for which a resume check operation is to be performed when the program is executed if the instruction is a candidate next instruction to be executed by one or more deactivated threads after at least one of a branch instruction or a jump instruction. In further examples, processor 102 may select an instruction as being an instruction for which a resume check operation is to be performed when the program is executed if the instruction is a target instruction of at least one of a forward branch instruction and a forward jump instruction. In additional examples, processor 102 may select an instruction as being an instruction for which a resume check operation is to be performed when the program is executed if the instruction is a next sequential instruction after a backward branch instruction.

In addition to or in lieu of selecting one or more instructions of a program as being instructions for which a resume check operation is to be performed when the program is executed, processor 102 may select one or more instructions as being instructions for which a resume check operation is not to be performed when a program is executed, and generate compiled code for the program such that the compiled code includes the selected one or more instructions and such that the selected one or more instructions include information indicating that the resume check operation is not to be performed for the selected one or more instructions.

FIG. 12 is a flow diagram illustrating another example technique for generating compiled code that selectively enables and disables a resume check operation according to this disclosure. Processor 102 generates preliminary compiled code for a program based on source code for the program (150). In some examples, the preliminary compiled code may be similar to the final compiled code to be generated by processor 102 except that the instructions in the preliminary compiled code do not indicate whether a resume check operation is to be performed for such instructions.

Processor 102 determines which instructions in the preliminary compiled code are control flow instructions (152). The control flow instructions may include, for example, jump instructions and conditional branch instructions. Processor 102 selects a control flow instruction for processing (154). Processor 102 determines if the selected control flow instruction is an instruction that is capable of causing processing system 10 to deactivate one or more threads in response to processing the instruction (156). In some examples, the set of instructions that are capable of causing processing system 10 to deactivate one or more threads in response to processing the instruction include a forward branch instruction, a backward branch instruction, and a forward jump instruction. In further examples, in addition to the instructions already described above, the set of instructions that are capable of causing processing system 10 to deactivate one or more threads in response to processing the instruction may also include a backward jump instruction.

If the selected control flow instruction is an instruction that is capable of causing processing system 10 to deactivate one or more threads in response to processing the instruction, then processor 102 may select the candidate next instruction as an instruction for which a resume check operation is to be performed (158). The candidate next instruction may refer to an instruction where the threads that are deactivated in response to processing the current control flow instruction would be scheduled to be reactivated. For example, if the instruction is a forward jump instruction or a forward branch instruction, then the candidate next instruction may be the target instruction specified in the forward jump instruction or the forward branch instruction. As another example, if the instruction is a backward branch instruction, then the candidate next instruction may be the next sequential instruction after the backward branch instruction (i.e., the instruction that occurs immediately after the backward branch instruction). In examples where a backward jump instruction constitutes an instruction that is capable of causing processing system 10 to deactivate one or more threads in response to processing the instruction, then the candidate next instruction for the backward jump instruction may be the next sequential instruction after the backward branch instruction (i.e., the instruction that occurs immediately after the backward jump instruction). After selecting the candidate next instruction as an instruction for which a resume check operation is to be performed, processor 102 may log the selection for use when generating the compiled code and proceed to decision box 160.

Returning to decision box 156, if the selected control flow instruction is an instruction that is not capable of causing processing system 10 to deactivate one or more threads in response to processing the instruction, then processor 102 may proceed to decision box 158 without selecting any instructions for the control flow instruction as being instructions for which a resume check operation is to be performed. In either case, processor 102 determines whether there are any more control flow instructions to process (160). If processor 102 determines that there are more control flow instructions to process, then processor 102 returns to process box 154 to process another control flow instruction. Otherwise, if processor 102 determines that there are not any more control flow instructions to process, then processor 102 proceeds to generate compiled code based on the instructions selected as being instructions for which a resume check is to be performed (162).

For example, for each of the instructions that were selected to be an instruction for which a resume check is to be performed, processor 102 may place information in the compiled instruction that indicates that a resume check operation is to be performed by a processor that executes the program and during an instruction cycle when the instruction is executed. For any instructions that were not selected to be an instruction for which a resume check is to be performed, processor 102 may place information in the compiled instruction that indicates that a resume check operation is not to be performed by the processor that executes the program and during an instruction cycle when the instruction is executed.

FIG. 13 illustrates an example program that may be executed without using the selective resume check activation techniques of this disclosure. As shown in FIG. 13, the numbers in the left-hand column represent instruction identification (ID) numbers. The instruction ID number for each instruction may, in some examples, correspond to a program counter value and/or an address associated with the instruction. The middle column represents the instruction that is associated with the instruction ID in the left-hand column. The right-hand column provides explanations of the instructions.

The instructions that have designations beginning with "alu" represent sequential (i.e., non-control flow) ALU instructions. The numbers following the "alu" designation merely designate that the ALU instructions may be different instructions. The instructions that are designated as "branch" instructions constitute conditional branch instructions with a target instruction (e.g., a target instruction ID) specified after the "branch" designation. Similarly, the instructions that are designated as "jump" instructions constitute jump instructions (i.e., an unconditional branch instruction) with a target instruction (e.g., a target instruction ID) specified after the "jump" designation.

As shown in FIG. 13, instruction 2 is a forward branch instruction that specifies instruction 5 as a target instruction. Instruction 4 is a forward jump instruction that specifies instruction 7 as a target instruction. Instruction 8 is a backward branch instruction that specifies instruction 1 as a target instruction.

FIG. 14 is a table illustrating an example execution sequence for the example program in FIG. 13. The execution sequence is shown with respect to two different threads (i.e., Thread 0 and Thread 1) executing in a processing system. The processing system may be similar to processing system 10 shown in FIG. 1 except that the system may have two processing elements 14 instead of four (or equivalently, two of the processing elements 14 may be permanently deactivated for the duration of the program). In addition, the processing system in this example automatically performs a resume check operation during every instruction cycle prior to executing the instruction. Thread 0 and Thread 1 may each be assigned to execute on a respective one of processing elements 14. Both threads may execute the instructions of the program in lockstep. That is, during a given instruction cycle, each thread, if active, may execute the same instruction of the program with respect to different data.

Each of the rows in FIG. 14 constitutes a single instruction processing cycle starting with the earliest instruction processing cycle on the top of the table. The "Instruction ID" column indicates the instruction that is executed and/or processed during a given instruction processing cycle. The "Thread 0" column indicates whether Thread 0 is active for a given instruction processing cycle, and the "Thread 1" column indicates whether Thread 1 is active for a given instruction processing cycle. An "X" designation in either of the "Thread 0" or "Thread 1" columns indicates that the respective thread is active for a given instruction processing cycle. An "0" designation in either of the "Thread 0" or "Thread 1" columns indicates that the respective thread is inactive for a given instruction processing cycle.

As shown in FIG. 14, both of the threads (i.e., Thread 0 and Thread 1) are initially active, and remain active while processing instructions 0 and 1, which are sequential instructions. When processing instruction 2, which is a forward branch instruction, Thread 1 satisfies the branch condition and Thread 0 does not satisfy the branch condition. Therefore, according to the "least-valued address first" thread processing order, control unit 12 deactivates Thread 1 and sets the resume counter for Thread 1 to a value of 5 (i.e., the address of the target instruction) to indicate that Thread 1 is scheduled to be reactivated at instruction 5. Control unit 12 proceeds to process instructions 3 and 4 with respect to active Thread 0.

At instruction 4, which is a forward jump instruction, control unit 12 deactivates all threads that are active. In particular, control unit 12 deactivates Thread 0 and sets the resume counter for Thread 0 to a value of 7 (i.e., the address of the target instruction) to indicate that Thread 0 is scheduled to be reactivated at instruction 7. Control unit 12 proceeds to sequentially increment the program counter value until the first of a resume counter value for an inactive thread is reached or the target program counter value for the jump instruction is reached.

As discussed above, a resume check operation is performed prior to processing the instruction during every instruction in this example. At instructions 3 and 4, the resume counter value for Thread 1 (i.e., "5") did not equal the program counter values for the instructions (i.e., "3" and "4," respectively). Therefore, Thread 1 remained deactivated while processing these instructions. However, at instruction 5, the resume counter value for Thread 1 (i.e., "5") does equal the program counter value for instruction 5. Therefore, control unit 12 reactivates Thread 1 prior to executing instruction 5. As part of the reactivation process, control unit 12 may set the resume counter for Thread 1 to a default value (e.g., a maximum register value). Meanwhile, Thread 0 remains inactive because the resume counter value for Thread 0 is equal to 7.

Control unit 12 proceeds to process instructions 5 and 6 with respect to active Thread 1. At instruction 7, Thread 0 is reactivated as part of the resume check operation because the resume counter value for Thread 0 (i.e., "7") equals the program counter value for instruction 7. Control unit 12 proceeds to process instruction 7 with respect to both threads.

At instruction 8, which is a backward branch instruction, Thread 0 satisfies the branch condition, and Thread 1 does not satisfy the branch condition. Therefore, according to the "least-valued address first" thread processing order, control unit 12 deactivates Thread 1 and sets the resume counter for Thread 1 to a value of 9 (i.e., the next sequential instruction after the backward branch instruction) to indicate that Thread 1 should be reactivated at instruction 9. Control unit 12 proceeds to process instructions 1-4 with respect to active Thread 0. At instruction 2, Thread 0 does not satisfy the branch condition, and therefore control flow proceeds to instruction 3.

At instruction 4, which is a forward jump instruction, control unit 12 deactivates all threads that are active. In particular, control unit 12 deactivates Thread 0 and sets the resume counter for Thread 0 a value of 7 (i.e., the address of the target instruction) to indicate that Thread 0 should be reactivated at instruction 7. Control unit 12 proceeds to sequentially increment the program counter value until the first of a resume counter value for an inactive thread is reached or the target program counter value for the jump instruction is reached.

Instructions 5 and 6 are processed, but are dormant instructions cycles because no threads are activated. At instruction 7, Thread 0 is reactivated as part of the resume check operation because the resume counter value for Thread 0 (i.e., "7") equals the program counter value for instruction 7. Control unit 12 proceeds to process instructions 7 and 8 with respect to active Thread 0.

At instruction 9, Thread 1 is reactivated as part of the resume check operation because the resume counter value for Thread 0 (i.e., "9") equals the program counter value for instruction 9. Control unit 12 proceeds to process instruction 9 with respect to both threads, which is the end of the program.

As discussed above, Thread 0 is deactivated two times after executing instruction 4 and, on each occasion, is reactivated prior to executing instruction 7. Thread 1 is deactivated after executing instructions 2 and 8 and is reactivated prior to executing instructions 5 and 9. The threads are deactivated due to either divergent branching or due to forward jump instructions. Because control unit 12 performs a resume check prior to executing every instruction, in this example, control unit 12 performs 18 different resume check operations even though threads were reactivated during only four of the instruction cycles.

FIG. 15 illustrates an example program that may be executed using the selective resume check activation techniques of this disclosure. The example program is similar to the example program shown in FIG. 13 except that asterisks (i.e., "*") are included in certain program instructions that indicate that a resume check operation is to be performed for such instructions. An instruction that does not include an asterisk indicates that a resume check is not to be performed for such an instruction.

As shown in FIG. 15 a compiler may select instructions 5, 7 and 9 as being instructions for which a resume check operation is to be performed. Instruction 5 was selected as an instruction for which a resume check operation is to be performed because the instruction is a target instruction of a forward branch instruction (i.e., instruction 2). Instruction 7 was selected as an instruction for which a resume check operation is to be performed because the instruction is a target instruction of a forward jump instruction (i.e., instruction 4). Instruction 9 was selected as an instruction for which a resume check operation is to be performed because the instruction is a next sequential instruction after a backward branch instruction (i.e., instruction 8).

FIG. 16 is a table illustrating an example execution sequence for the example program in FIG. 15 according to this disclosure. The example execution sequence is FIG. 16 is similar to that which was described above with respect to FIG. 14 except that a resume check operation is not performed during every instruction cycle. Instead, a resume check operation is performed only for the instruction cycles where an instruction is marked with an asterisk in FIG. 15 (i.e., instructions 5, 7 and 9).

As shown in FIG. 16, the number of resume check operations performed during the example execution sequence of FIG. 16 is 5. Therefore, by selectively activating resume check operations according to the techniques of this disclosure, the number of resume check operations performed in this example was reduced from 18 operations performed during 18 different instruction cycles (which occurred in FIG. 14) to 5 operations performed during 5 instruction cycles. A resume check operation may involve, in some examples, the performance of many comparison operations, which may consume a significant amount of power each time the operation is performed and may contribute significantly to the time it takes to process an instruction. Therefore, by reducing the number of resume check operations that need to be performed by a processing system according to the selective resume check activation techniques of this disclosure, the power consumption of a processing system may be reduced and/or the performance of the processing system may be increased compared to processing systems where a resume check operation is automatically performed for each instruction of a program.

Moreover, because the resume check operation was disabled for instructions at which it was determined that no threads would need to be reactivated during the execution of the program, the selective disablement of the resume check operation did not compromise the integrity of the thread reactivation in the processing system or increase the number of processing cycles needed to execute the program. In this manner, the techniques of this disclosure may, in some examples, be used to reduce the power consumption of and/or increase the performance of a processing system without adversely affecting the integrity of the thread reactivation process and without increasing the number of processing cycles needed to execute the program.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method comprising:
executing, with a processor, an instruction that includes information indicative of whether a resume check operation is to be performed for the instruction; and
selectively enabling or disabling, with the processor, the resume check operation for the instruction based on the information included in the instruction, the resume check operation being an operation that comprises comparing each of a plurality of resume counter values to a program counter value associated with the instruction, each of the resume counter values being associated with a respective one of a plurality of threads executing on the processor, wherein each of the resume counter values is indicative of a respective value of the program counter value at which a thread corresponding to the respective resume counter value is scheduled to be activated if the thread is inactive.

2. The method of claim 1,
wherein executing the instruction comprises executing the instruction during an instruction cycle, and
wherein selectively enabling or disabling the resume check operation comprises:
determining whether the information included in the instruction indicates that the resume check operation is to be performed for the instruction;
enabling the resume check operation for the instruction cycle in response to determining that the information included in the instruction indicates that the resume check operation is to be performed for the instruction; and
disabling the resume check operation for the instruction cycle in response to determining that the information included in the instruction indicates that the resume check operation is not to be performed for the instruction.

3. The method of claim 1, wherein the resume check operation further comprises, for each of the plurality of resume counter values, activating a respective one of the plurality of threads associated with the respective resume counter value if the respective resume counter value is equal to the program counter value.

4. The method of claim 1, wherein the processor is a first processor, the method further comprising:
selecting, with a second processor, one or more instructions of a program as being instructions for which a resume check operation is to be performed when the program is executed; and
generating, with the second processor, compiled code for the program such that the compiled code includes the selected one or more instructions and such that the selected one or more instructions include information indicating that the resume check operation is to be performed for the selected one or more instructions.

5. The method of claim 4, wherein selecting the one or more instructions comprises:
selecting an instruction as being an instruction for which a resume check operation is to be performed when the program is executed if the instruction is a candidate next instruction to be executed by one or more threads that are deactivated in response to executing at least one of a branch instruction or a jump instruction.

6. The method of claim 4, wherein selecting the one or more instructions comprises:
selecting an instruction as being an instruction for which a resume check operation is to be performed when the program is executed if the instruction is a instruction of at least one of a forward branch instruction and a forward jump instruction.

7. The method of claim 4, wherein selecting the one or more instructions comprises:
selecting an instruction as being an instruction for which a resume check operation is to be performed when the program is executed if the instruction is a next sequential instruction after a backward branch instruction.

8. The method of claim 4, wherein the first processor is different than the second processor.

9. The method of claim 1, wherein each of the resume counter values is equal to a default value if the thread corresponding to the respective resume counter value is active.

10. The method of claim 1, wherein the processor comprises one or more registers, and wherein the processor stores the resume counter values in the one or more registers.

11. The method of claim 1, wherein the instruction specifies a main operation to be performed in addition to indicating whether to perform the resume check operation.

12. The method of claim 11, wherein when the resume check operation is performed, the resume check operation is performed prior to performing the main operation.

13. The method of claim 1, wherein the information indicative of whether to perform the resume check operation for the instruction comprises a one-bit flag.

14. The method of claim 1, further comprising:
wherein executing the instruction comprises executing, with the processor, the instruction during an instruction cycle, and
wherein selectively enabling or disabling the resume check operation comprises:
determining, with the processor, whether the information included in the instruction indicates that the resume check operation is to be performed for the instruction;
performing, with the processor, the resume check operation in response to determining that the information included in the instruction indicates that the resume check operation is to be performed for the instruction; and
not performing, with the processor, the resume check operation in response to determining that the information included in the instruction indicates that the resume check operation is not to be performed for the instruction.

15. The method of claim 14, wherein performing, with the processor, the resume check operation comprises:
comparing each of the plurality of resume counter values to a program counter value associated with the instruction; and
for each of the plurality of resume counter values, activating a respective one of the plurality of threads associated with the respective resume counter value if the respective resume counter value is equal to the program counter value.

16. A device comprising:
a memory; and
a processor configured to execute an instruction that includes information indicative of whether a resume check operation is to be performed for the instruction, and to selectively enable or disable the resume check operation for the instruction based on the information included in the instruction, the resume check operation being an operation that comprises comparing each of a plurality of resume counter values stored in the memory to a program counter value stored in the memory associated with the instruction, each of the resume counter values being associated with a respective one of a plurality of threads executing on the processor, wherein each of the resume counter values is indicative of a respective value of the program counter value at which a thread corresponding to the respective resume counter value is scheduled to be activated if the thread is inactive.

17. The device of claim 16, wherein the processor is further configured to execute the instruction during an instruction cycle, to determine whether the information included in the instruction indicates that the resume check operation is to be performed for the instruction, to enable the resume check operation for the instruction cycle in response to determining that the information included in the instruction indicates that the resume check operation is to be performed for the instruction, and to disable the resume check operation for the instruction cycle in response to determining that the information included in the instruction indicates that the resume check operation is not to be performed for the instruction.

18. The device of claim 16, wherein the resume check operation further comprises, for each of the plurality of resume counter values, activating a respective one of the plurality of threads associated with the respective resume counter value if the respective resume counter value is equal to the program counter value.

19. The device of claim 16, wherein the processor is a first processor, the device further comprising:
   a second processor configured to select one or more instructions of a program as being instructions for which a resume check operation is to be performed when the program is executed, and to generate compiled code for the program such that the compiled code includes the selected one or more instructions and such that the selected one or more instructions include information indicating that the resume check operation is to be performed for the selected one or more instructions.

20. The device of claim 19, wherein the second processor is further configured to select an instruction as being an instruction for which a resume check operation is to be performed when the program is executed if the instruction is a candidate next instruction to be executed by one or more deactivated threads after at least one of a branch instruction or a jump instruction.

21. The device of claim 19, wherein the second processor is further configured to select an instruction as being an instruction for which a resume check operation is to be performed when the program is executed if the instruction is a target instruction of at least one of a forward branch instruction and a forward jump instruction.

22. The device of claim 19, wherein the second processor is further configured to select an instruction as being an instruction for which a resume check operation is to be performed when the program is executed if the instruction is a next sequential instruction after a backward branch instruction.

23. The device of claim 19, wherein the first processor is different than the second processor.

24. The device of claim 16, wherein each of the resume counter values is equal to a default value if the thread corresponding to the respective resume counter value is active.

25. The device of claim 16, wherein the processor comprises one or more registers, and wherein the processor stores the resume counter values in the one or more registers.

26. The device of claim 16, wherein the instruction specifies a main operation to be performed in addition to indicating whether to perform the resume check operation.

27. The device of claim 26, wherein when the resume check operation is performed, the resume check operation is performed prior to performing the main operation.

28. The device of claim 16, wherein the information indicative of whether to perform the resume check operation for the instruction comprises a one-bit flag.

29. The device of claim 16, wherein the processor is further configured to execute the instruction during an instruction cycle, to determine whether the information included in the instruction indicates that the resume check operation is to be performed for the instruction, to perform the resume check operation during the instruction cycle in response to determining that the information included in the instruction indicates that the resume check operation is to be performed for the instruction, and to not perform the resume check operation during the instruction cycle in response to determining that the information included in the instruction indicates that the resume check operation is not to be performed for the instruction.

30. The device of claim 29, wherein the processor is further configured to compare each of the plurality of resume counter values to a program counter value associated with the instruction, and for each of the plurality of resume counter values, to activate a respective one of the plurality of threads associated with the respective resume counter value if the respective resume counter value is equal to the program counter value.

31. The device of claim 16, wherein the device comprises a wireless communication device.

32. The device of claim 16, wherein the device comprises a mobile phone handset.

33. An apparatus comprising:
   means for executing an instruction that includes information indicative of whether a resume check operation is to be performed for the instruction; and
   means for selectively enabling or disabling the resume check operation for the instruction based on the information included in the instruction, the resume check operation being an operation that comprises comparing each of a plurality of resume counter values to a program counter value associated with the instruction, each of the resume counter values being associated with a respective one of a plurality of threads executing on a processor, wherein each of the resume counter values is indicative of a respective value of the program counter value at which a thread corresponding to the respective resume counter value is scheduled to be activated if the thread is inactive.

34. The apparatus of claim 33,
   wherein the means for executing the instruction comprises means for executing the instruction during an instruction cycle, and
   wherein the means for selectively enabling or disabling the resume check operation comprises:
      means for determining whether the information included in the instruction indicates that the resume check operation is to be performed for the instruction;
      means for enabling the resume check operation for the instruction cycle in response to determining that the information included in the instruction indicates that the resume check operation is to be performed for the instruction; and
      means for disabling the resume check operation for the instruction cycle in response to determining that the information included in the instruction indicates that the resume check operation is not to be performed for the instruction.

35. The apparatus of claim 33, further comprising:
   means for selecting one or more instructions of a program as being instructions for which a resume check operation is to be performed when the program is executed; and
   means for generating compiled code for the program such that the compiled code includes the selected one or more instructions and such that the selected one or more instructions include information indicating that the resume check operation is to be performed for the selected one or more instructions.

36. The apparatus of claim 35, wherein the means for selecting the one or more instructions comprises:
   means for selecting an instruction as being an instruction for which a resume check operation is to be performed when the program is executed if the instruction is a candidate next instruction to be executed by one or more threads that are deactivated in response to executing at least one of a branch instruction or a jump instruction.

37. The apparatus of claim 33, wherein each of the resume counter values is equal to a default value if the thread corresponding to the respective resume counter value is active.

38. The apparatus of claim 33, wherein the instruction specifies a main operation to be performed in addition to indicating whether to perform the resume check operation, and wherein when the resume check operation is performed, the resume check operation is performed prior to performing the main operation.

39. The apparatus of claim 33, further comprising:
wherein the means for executing the instruction comprises means for executing the instruction during an instruction cycle, and
wherein the means for selectively enabling or disabling the resume check operation comprises:
means for determining whether the information included in the instruction indicates that the resume check operation is to be performed for the instruction;
means for performing the resume check operation in response to determining that the information included in the instruction indicates that the resume check operation is to be performed for the instruction; and
means for not performing the resume check operation in response to determining that the information included in the instruction indicates that the resume check operation is not to be performed for the instruction.

40. The apparatus of claim 39, wherein the means for performing the resume check operation comprises:
means for comparing each of the plurality of resume counter values to a program counter value associated with the instruction; and
means for activating, for each of the plurality of resume counter values, a respective one of the plurality of threads associated with the respective resume counter value if the respective resume counter value is equal to the program counter value.

41. A non-transitory computer-readable storage medium storing instructions that, when executed, cause one or more processors to:
execute an instruction that includes information indicative of whether a resume check operation is to be performed for the instruction; and
selectively enable or disable the resume check operation for the instruction based on the information included in the instruction, the resume check operation being an operation that comprises comparing each of a plurality of resume counter values to a program counter value associated with the instruction, each of the resume counter values being associated with a respective one of a plurality of threads executing on the one or more processors, wherein each of the resume counter values is indicative of respective value of the program counter value at which a thread corresponding to the respective resume counter value is scheduled to be activated if the thread is inactive.

42. The non-transitory computer-readable storage medium of claim 41,
wherein the instructions that, when executed, cause one or more processors to execute the instruction comprise instructions that, when executed, cause one or more processors to execute the instruction during an instruction cycle, and
wherein the instructions that, when executed, cause one or more processors to selectively enable or disable the resume check operation comprise instructions that, when executed, cause one or more processors to:
determine whether the information included in the instruction indicates that the resume check operation is to be performed for the instruction;
enable the resume check operation for the instruction cycle in response to determining that the information included in the instruction indicates that the resume check operation is to be performed for the instruction; and
disable the resume check operation for the instruction cycle in response to determining that the information included in the instruction indicates that the resume check operation is not to be performed for the instruction.

43. The non-transitory computer-readable storage medium of claim 41, further comprising instructions that, when executed, cause one or more processors to:
select one or more instructions of a program as being instructions for which a resume check operation is to be performed when the program is executed; and
generate compiled code for the program such that the compiled code includes the selected one or more instructions and such that the selected one or more instructions include information indicating that the resume check operation is to be performed for the selected one or more instructions.

44. The non-transitory computer-readable storage medium of claim 43, wherein the instructions that, when executed, cause one or more processors to select the one or more instructions comprise instructions that, when executed, cause one or more processors to:
select an instruction as being an instruction for which a resume check operation is to be performed when the program is executed if the instruction is a candidate next instruction to be executed by one or more threads that are deactivated in response to executing at least one of a branch instruction or a jump instruction.

45. The non-transitory computer-readable storage medium of claim 41, wherein each of the resume counter values is equal to a default value if the thread corresponding to the respective resume counter value is active.

46. The non-transitory computer-readable storage medium of claim 41, wherein the instruction specifies a main operation to be performed in addition to indicating whether to perform the resume check operation, and wherein when the resume check operation is performed, the resume check operation is performed prior to performing the main operation.

47. The non-transitory computer-readable storage medium of claim 41, further comprising:
wherein the instructions that, when executed, cause one or more processors to execute the instruction comprise instructions that, when executed, cause one or more processors to execute the instruction during an instruction cycle, and
wherein the instructions that, when executed, cause one or more processors to selectively enable or disable the resume check operation comprise instructions that, when executed, cause one or more processors to:
determine whether the information included in the instruction indicates that the resume check operation is to be performed for the instruction;
perform the resume check operation in response to determining that the information included in the instruction indicates that the resume check operation is to be performed for the instruction; and not perform the resume check operation in response to determining that the information included in the instruction indicates that the resume check operation is not to be performed for the instruction.

48. The non-transitory computer-readable storage medium of claim 47, wherein the instructions that, when executed, cause one or more processors to perform the resume check operation comprise instructions that, when executed, cause one or more processors to:

compare each of the plurality of resume counter values to a program counter value associated with the instruction; and for each of the plurality of resume counter values, activate a respective one of the plurality of threads associated with the respective resume counter value if the respective resume counter value is equal to the program counter value.

* * * * *